United States Patent
Koike et al.

[11] Patent Number: 6,024,438
[45] Date of Patent: Feb. 15, 2000

[54] INK JET PRINTER

[75] Inventors: Keiichi Koike; Keiki Yamada; Masatoshi Katoh; Masaru Ohnishi, all of Tokyo, Japan

[73] Assignee: Mitsushita Denki Kabushiki Kaisha, Tokyo, Japan

[21] Appl. No.: 08/756,906

[22] Filed: Nov. 26, 1996

[30] Foreign Application Priority Data

Dec. 14, 1995 [JP] Japan ................................ 7-325594

[51] Int. Cl.⁷ .............................. B41J 2/21; B41J 2/205; B41J 29/38
[52] U.S. Cl. .................................. 347/43; 347/15; 347/14
[58] Field of Search .................................. 347/12, 14, 43, 347/100, 15, 71, 3; 358/462, 523, 298

[56] References Cited

U.S. PATENT DOCUMENTS

| | | | |
|---|---|---|---|
| 4,222,060 | 9/1980 | Sato et al. | 347/12 |
| 4,560,997 | 12/1985 | Sato et al. | 347/15 |
| 4,686,538 | 8/1987 | Yasuo | 347/15 |
| 4,713,746 | 12/1987 | Watanabe et al. | 347/15 |
| 4,959,659 | 9/1990 | Sasaki et al. | 347/100 |
| 5,220,342 | 6/1993 | Moriyama | 347/43 |
| 5,252,986 | 10/1993 | Takaoka et al. | 358/298 |
| 5,339,171 | 8/1994 | Fujisawa et al. | 358/298 |
| 5,446,802 | 8/1995 | Tada et al. | 382/170 |
| 5,473,446 | 12/1995 | Perumal, Jr. et al. | 358/523 |
| 5,617,127 | 4/1997 | Takeuchi et al. | 347/71 |
| 5,625,397 | 4/1997 | Allred et al. | 347/100 |

FOREIGN PATENT DOCUMENTS

| | | |
|---|---|---|
| 0390473 | 10/1990 | European Pat. Off. . |
| 0488724 | 6/1992 | European Pat. Off. . |
| 0517521 | 12/1992 | European Pat. Off. . |
| 60-19538 | 1/1985 | Japan . |
| 60-21291 | 2/1985 | Japan . |
| 60-262663 | 12/1985 | Japan . |

*Primary Examiner*—N. Le
*Assistant Examiner*—Thinh Nguyen

[57] ABSTRACT

A plurality of heads with a plurality types of ink each having a different density for the same color filled therein and ejecting the ink are provided, and also a control means for controlling volume of ink drops ejected for each dot is provided. When forming a pixel, a head is selected by the control means with volume of ink drops ejected from each head controlled, and two or more types of ink are ejected at one position with varied dot diameter for representation of density gradations.

16 Claims, 17 Drawing Sheets

| IMAGE SIGNAL | HEAD 2a | HEAD 2b | HEAD 2c |
|---|---|---|---|
| | | | |
| K | 20 | 18 | 0 |
| K+1 | 20 | 0 | 15 |
| | | | |

| 7 | 8 | 9 | 10 |
|---|---|---|---|
| 6 | 1 | 2 | 11 |
| 5 | 4 | 3 | 12 |
| 16 | 15 | 14 | 13 |

FIG.18

| GRADATION SIGNAL | HEAD 2a | HEAD 2b | HEAD 2c |
|---|---|---|---|
| 0 | 0 | 0 | 0 |
| 1 | 1 | 0 | 0 |
| 2 ⸺ 18 | 0 | 0 | 0 |
| 19 | 1 | 0 | 0 |
| K | 20 | 18 | 0 |
| K+1 | 20 | 0 | 15 |

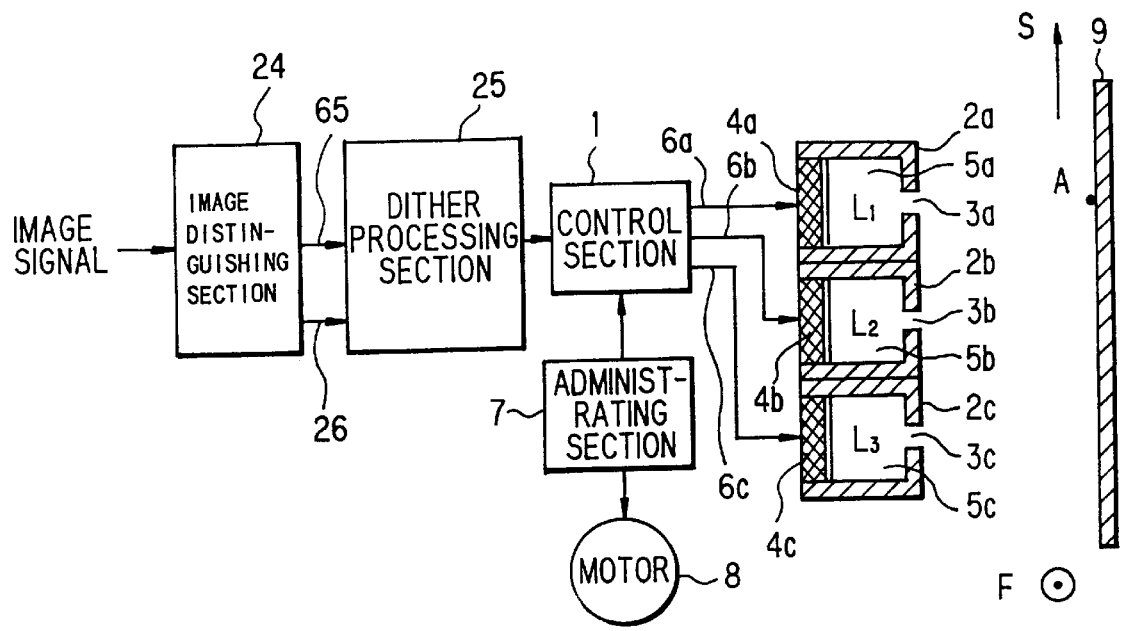

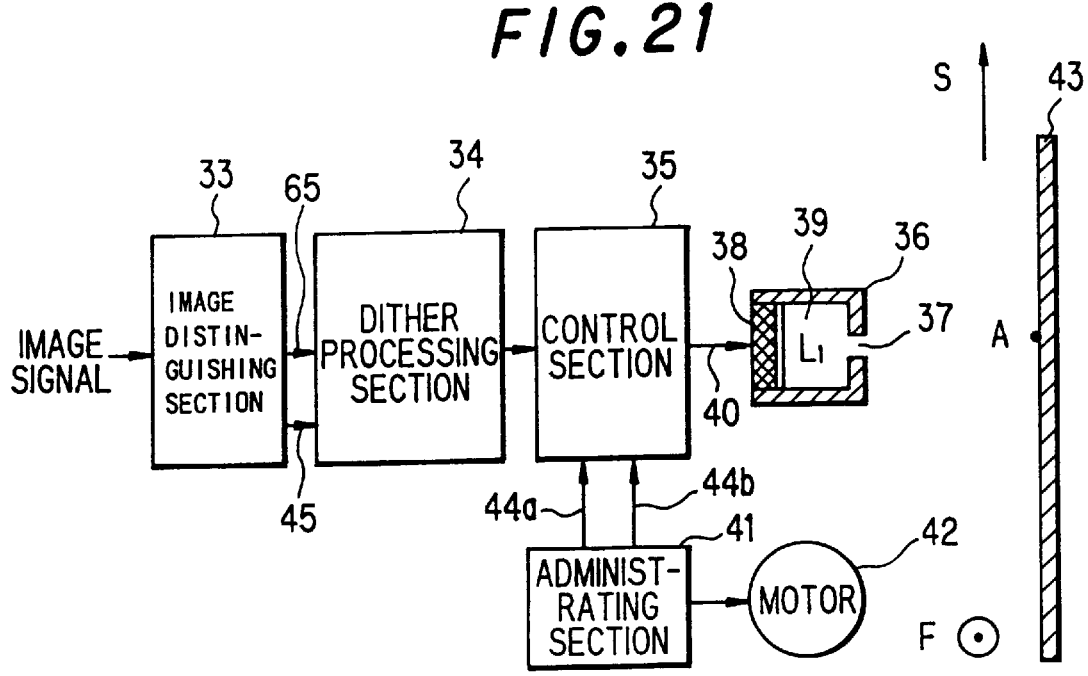

| IMAGE SIGNAL | FIRST | SECOND |
|---|---|---|
| 0 | 0 | 0 |
| 1 | 1 | 0 |
| 2 ≀ 18 | 0 | 0 |
| 19 | 1 | 0 |
| K | 20 | 15 |
| K+1 | 20 | 15 |

*FIG. 29*
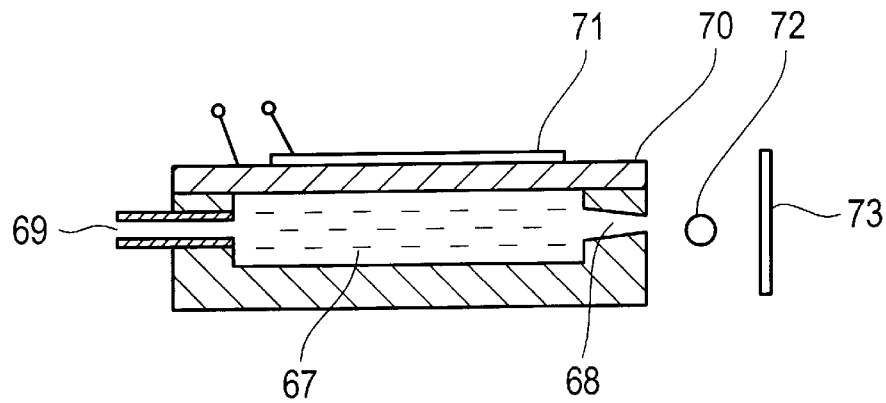
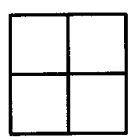
*FIG. 30A*
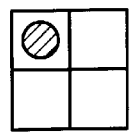
*FIG. 30B*
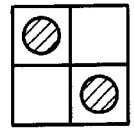
*FIG. 30C*
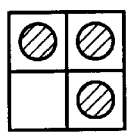
*FIG. 30D*
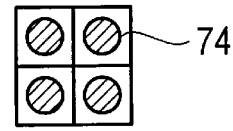
*FIG. 30E*
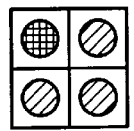
*FIG. 30F*
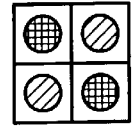
*FIG. 30G*
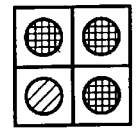
*FIG. 30H*
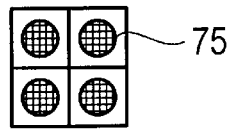
*FIG. 30J*

INK JET PRINTER

FIELD OF THE INVENTION

The present invention relates to an ink jet printer for gradation images.

BACKGROUND OF THE INVENTION

As an on-demand type of ink jet printing system, there are the piezoelectric system in which ink is pressurized and ejected by a piezoelectric element, and the thermal system in which ink is rapidly boiled by a heating element and the ink is ejected by generated bubbles. An example of the piezoelectric system is disclosed, for instance, in Japanese Patent Laid-Open Publication No. SHO 60-19538. FIG. 29 shows an ink jet head disclosed in the publication. In this figure, designated at the reference numeral 67 is an ink chamber, at 68 an ejection nozzle for ejecting ink therefrom, at 69 an ink supply hole, at 70 a flexible upper plate, at 71 a piezoelectric element, at 72 an ink drop, and at 73 printing paper.

Next, a description is made for operations of this printing head. An edge of the ink chamber 67 is opened via the ejection nozzle 68 for ejecting ink to atmosphere, and the other edge is communicated to the ink supply hole 69. The piezoelectric element 71 is adhered to the flexible upper plate 70 constituting a portion of a wall of the ink chamber 67. The ink is supplied through the ink supply hole 69 into the ink chamber 67. When a driving pulse is loaded to the piezoelectric element 71, the upper plate 70 is bent in the direction in which a capacity of the ink chamber 67 is reduced, and a pressure wave is generated in the chamber. Due to this pressure wave, the ink is ejected from the ejection nozzle 68, and ink drops 72 are ejected to the printing paper 73.

Conventionally, in a case where an image is printed by using this type of ink jet print-head, controls are provided only so that ink is ejected or not ejected to each pixel constituting the image. For this reason, generally in a case where gradation of an image is represented, graduation image is provided by using a digital halftoning method such as the dither method or dot pattern method. For instance, in a case of the dot pattern method, one pixel is represented with an m×n dot matrix, and gradation level in a range from 0 (zero) to m×n is expressed with a number of dots to be printed in each dot matrix, said number. For instance, when a 4×4 dot matrix is used, it is possible to represent 17 gradation levels from 0 to 16. For this reason, more gradation levels can be expressed by making size of a dot matrix larger. On the other hand, however, by making larger size of a dot matrix, resolution of an actual image becomes lower. In a case of a 4×4 dot matrix as an example, the resolution of a printed image is one fourth of the original resolution.

So as a method of representing many gradation levels without making lower resolution of a printed image, there is available such a method as that disclosed in the same publication (Japanese Patent Laid-Open Publication No. SHO 60-19538) in which a plurality types of ink each having a different density are used. Description is made for this method referring to a case where two types of ink each having a different density are used and a picture element is expressed with a 2×2 dot matrix. In FIG. 30, the dot pattern expressed according to the method is shown. In this figure, a dot 74 is printed with low density ink, while a dot 75 is expressed with high density ink. In a case where single density ink is used, only 5 gradations from 0 to 4 can be represented, while, when two types of ink are used, 9 gradations from 0 to 8 can be represented. Furthermore by increasing types of ink, a number of gradation levels can be increased, and it becomes possible to represent many gradation levels without making larger size of a dot matrix.

In this case, however, when one type of ink is added for use, only 4 gradations are increased, and when it is tried to realize many gradation levels, it is necessary to use many types of ink, which will result in cost increase and required a large scale system.

As a method of representing many gradation levels based on the conventional technology, also there is available a method in which a number of gradation levels are represented by changing volume of ink drops to be ejected. In this case, as a density range which can be represented with one type of ink is limited, a plurality of ink each having a different density are used, and one type of ink is selected to a density level to be reproduced. FIG. 31 shows the reflection density characteristics in a case where two types of ink each having a different density are used. In this figure, the reference numeral 76 indicates the reflection density characteristics of low density ink, while the reference numeral 77 indicates the reflection density characteristics of high density ink. This figure plotted with the horizontal axis indicating a voltage shows that, as the voltage becomes higher, the larger ink drops to be ejected and the higher reflection density can be obtained. In this method, selection of up to two types of ink and reproduction of reflection density ranges from D0 to D3 by changing volume of ink drops are possible. Herein description is made especially with reference to the reflection densities D1 and D2. To make reproduced reflection densities continuous by switching the two types of ink to be used, it is necessary to switch a voltage from the voltage ranges e2 to e3 for reflection densities D1 to D2 of the low density ink 76 to voltage range e0 to e1 for reflection densities D1 to D2 for the high density ink 77. In this step, volume of ink drops obtained in the range e3 to e3 is quite different from that obtained in the range from e0 to e1, and as a result diameters of formed dots are largely different.

In a case where a plurality types of ink each having a different density are used, there are available for the purpose to obtain the same reflection density a method in which a small dot is formed with high density ink, and a method in which a large dot is formed with low density dot, and even if the reflection densities in both cases are identical, texture of formed images is substantially different in visual feeling. Also if switching from small dots formed with high density ink to large dots formed with low density ink is executed in an area where a density level of an image signal to be printed gradually changes, continuity of the reflection densities is insured, but clear difference in visual feeling for image quality appears, and a border between dots formed with low density ink and those formed with high density ink appears as an artifact. To solve this problem, for instance, Japanese Patent Laid-Open Publication No. SHO 60-21291 discloses a method in which the problem as described above is solved by using a digital halftoning method in an area in which ink density is switched and furthermore using a combination of varied dot diameters with low density ink as well as with high density ink.

In a case where the method as described above is used, however, as a gradation expression different from a gradation to be reproduced is employed in some areas, the portion becomes all the more remarkable in some images, and an excellent image can not always be obtained. Also there is a limit for size of a dot diameter which can be realized, and in an area where a density lower than that realized with minimum dot size is required, a desired gradation can not be reproduced.

Configuration of an ink jet printer based on the conventional technology is as described above, gradation levels are expressed by means of the digital halftoning method making use of a dot matrix, and for this reason resolution of an actually printed image is inferior to that of the original image, which makes it impossible to obtain a high quality image. Also in a case where density gradation is used, discontinuous gradation representation occurs in some portions of a reproduced density area, and also in this case an excellent image quality can not be obtained. Furthermore, in an area where density is lower than a density value for minimum dot diameter size, gradation representation can not be realized, which is disadvantageous.

SUMMARY OF THE INVENTION

It is a first object of the present invention to obtain an ink jet printer which enables representation with many gradation levels and thus makes it possible to obtain an excellent image quality without giving any damage to the resolution of a printed. It is a second object of the present invention to obtain an ink jet printer which makes it possible to always obtain an excellent image quality irrespective of a type of an image to be printed. It is a third object of the present invention to obtain an ink jet printer which can represent gradation image also in an area where the density is lower than a density value for the obtainable minimum dot diameter size.

Firstly, the ink jet printer according to the present invention comprises a control means for controlling an ink ejecting means so that a plurality types of ink for same color each having a different density is ejected with a desired dot diameter onto a receiving medium according to an input image signal, a driving means for driving the ink ejecting means, and an administrating means for controlling the control means and the driving means so that a plurality types each having a different density of ink are ejected one above another at a same position on the receiving medium.

Secondly, the control means changes a pulse width according to a control signal from the ink ejecting means for controlling volume of ink drops.

Thirdly, a piezoelectric element is used as a pressure generating means, and the control means changes a rise time according to a control signal from the ink ejecting means as a method of controlling volume of ink drops.

Fourthly, a gradation converting means for subjecting an input image signal to digital halftoning processing is provided.

Fifthly, the gradation converting means subjects pixels included in a low density area where a gradation can not be represented only with a combination of variable dot diameter with a plurality types of ink each having a different density to digital halftoning processing to realize the gradation level.

Sixthly, the ink jet printer according to the present invention comprises an image distinguishing means for distinguishing characters and illustrations from natural pictures, and the gradation converting means has a plurality of dither matrix each having a different matrix pattern or different matrix size and switches a dither matrix for dither processing according to a type of an image determined by the image distinguishing means.

Seventhly, the ink jet printer according to the present invention for printing a plurality dots of ink each dot having the same density one above another at a same position on a receiving medium by controlling volume of ink drops ejected from a head by means of changing a dot diameter with the control means has a plurality of dither matrixes each having a different matrix pattern and different matrix size and comprises a dither processing means for executing dither processing by means of switching the dither matrix according to a type of the distinguished image.

Eighthly, the means described above has a plurality of heads each ejecting ink having the same density.

Ninthly, the ink jet printer according to the present invention for printing a plurality dots of ink each dot having the same density one above another at a same position on a receiving medium by controlling volume of ink drops ejected from a head by means of changing a dot diameter with the control means comprises a gradation converting means for subjecting pixels included in a low density area which can not be represented only by changing a dot diameter and ejecting ink at a same position one above another to the digital halftoning processing to realize the gradation level.

Tenthly, the means described just above comprises a plurality of heads each ejecting ink having the same density.

Other objects and features of this invention will become understood from the following description with reference to the accompanying drawings.

BRIEF DESCRIPTION OF THE DRAWINGS

FIG. 18 is a view showing a table for selection of a head in Embodiment 5 of the present invention;

FIG. 19 is a view showing configuration of an ink jet printer in Embodiment 6 of the present invention;

FIGS. 20A and 20B are views showing a dither matrix in Embodiment 6 of the present invention;

FIG. 21 is a view showing configuration of an ink jet printer in Embodiment 7 of the present invention;

FIG. 22 is a view showing a table for a driving condition for driving a head in Embodiment 7 of the present invention;

FIG. 29 is a view showing a cross-sectional view of a nozzle in the conventional type of ink jet printer;

FIG. 30 is a view showing the conventional type of gradation representing method.

DESCRIPTION OF THE PREFERRED EMBODIMENT

Figure 1:
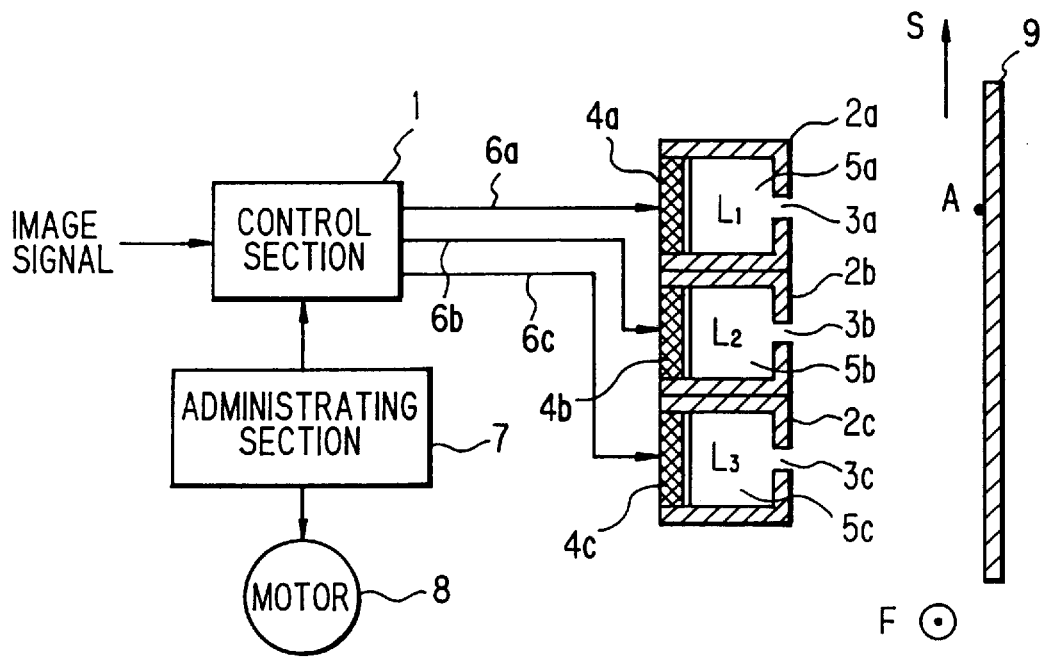
FIG. 1 shows configuration of an ink jet printer according to Embodiment 1 of the present invention.

Next, a description is made for the Embodiment 1 of the present invention with reference to the related drawings. FIG. 1 shows configuration of the Embodiment 1 of the present invention, and in this figure, designated at the reference numerals 2a, 2b, 2c are ink jet heads as ink ejecting means comprising ejection nozzles 3a, 3b, 3c, pressure generating elements 4a, 4b, 4c, and ink chambers 5a, 5b, 5c respectively, at 1 a control section for generating driving signals 6a, 6b, 6c for driving the ink jet heads 2a, 2b, 2c according to an input image signal respectively, at 8 a motor as a driving means for moving the ink jet heads, at 7 an administrating section for controlling the control section 1 and the motor 8, and at 9 a receiving medium.

Next, a description is made for operations of the ink jet printer according to the present invention in this Embodiment 1. A plurality types of ink each having a different density are filled in the three ink jet heads 2 (called head hereinafter). When an image signal is inputted into the control section 1, the control section 1 generates the driving signals 6a, 6b, 6c for the heads 2a, 2b, 2c which eject ink according to a signal level for each pixel constituting the image and outputs the signals to each of the heads 2. Herein the image signal is defined as expression of a density value for each pixel constituting an image with digital data. The pressure generating elements 4a, 4b, 4c generate a pressure corresponding to each of the driving signals 6a, 6b, 6c. A plurality types of ink having the density values of L1, L2, L3 are filled in the heads 2a, 2b, 2c, respectively, the ink is ejected from the ejection nozzles 3a, 3b, 3c due to the pressure generated by the pressure generating elements 4a, 4b, 4c, and dots is formed on the receiving medium 9. Then volume of ink drops is changed by controlling a voltage of the driving signal 6, thus a diameter of a dot formed on the receiving medium being controlled.

Any type of the pressure generating element 4 may be used on the condition that pressure can be loaded to ink, and for instance, an electricity-mechanical movement converting element such as a piezoelectric element, or an electricity-heat converting element which loads pressure with bubbles generated with ink in the ink chamber heated is available for this purpose.

The administrating section 7 drives the motor 8 to make the head 2 scan in the direction S as indicated by the arrow mark (called the main scanning direction) and also sends a start signal described later to the control section 1 to print an image for one line in the direction S. When printing for one line is finished, the administrating section 7 feeds the receiving medium 9 by one line using a motor (not shown) for moving the receiving medium in the direction F (called auxiliary scanning direction) perpendicular to the direction S in which the head 2 scans, executes printing for a next one line, and repeats the operations until printing for all lines is finished.

Figure 2:
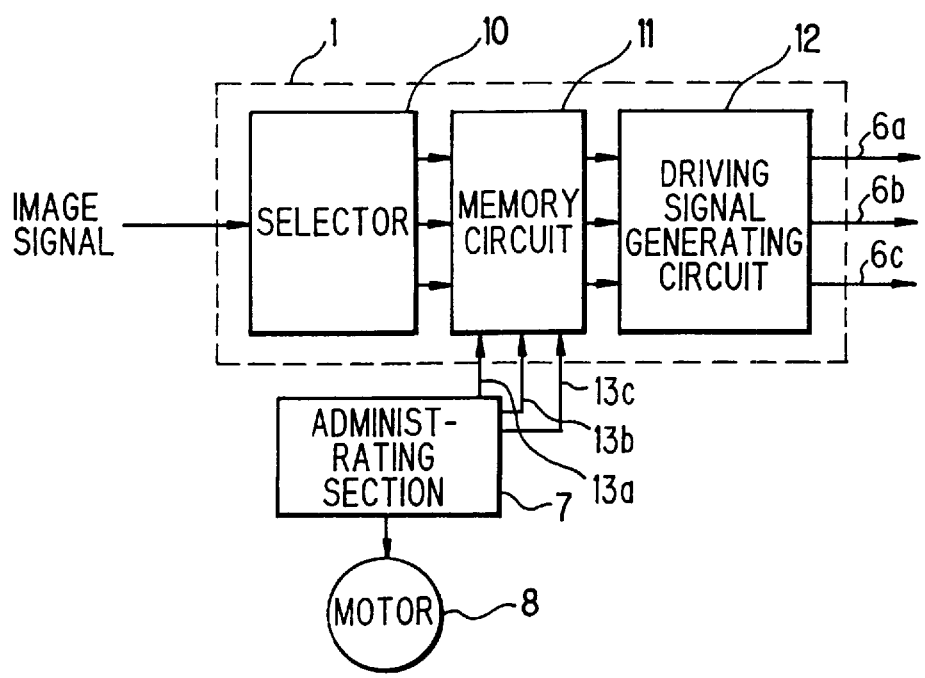
FIG. 2 is a block diagram showing configuration of a control section in Embodiment 1 of the present invention.

Next description is made for the control section 1. FIG. 2 shows an example of configuration of the control section according to the present invention. In this figure, designated at the reference numeral 10 is a selector for outputting driving conditions for the heads 2a, 2b, 2c shown in FIG. 1 according to the inputted image signal, at 11 a memory circuit for storing driving conditions for each head line for line by line, at 12 a driving signal generating circuit for generating the driving signals 6a, 6b, 6c for driving the pressure generating elements 4a, 4b, 4c, and at 13a, 13b, 13c start signals from the administrating section for giving a timing for ejecting ink to each head to print ink ejected from the heads 2a, 2b, 2c at a same position one above another on the receiving medium 9.

Figures 3, 4:
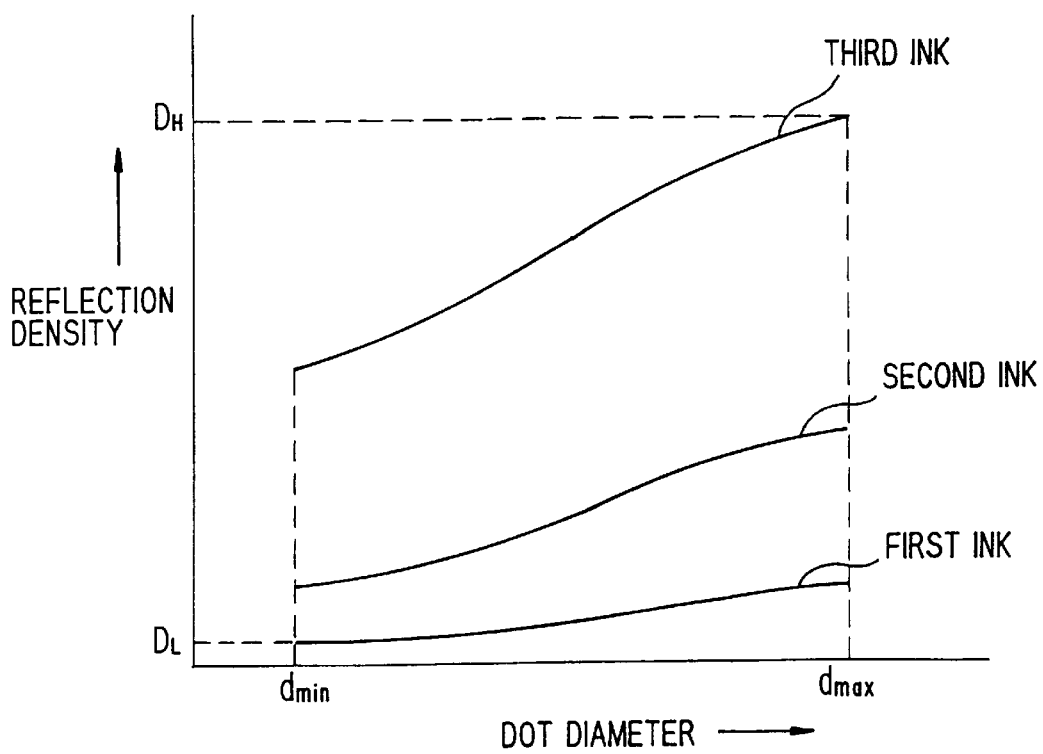
FIG. 3 shows a table in which data for selection of a head is written in Embodiment 1 of the present invention.
FIG. 4 is a view showing density distribution of ink in Embodiment 1 of the present invention.

Next description is made for operations of the control section 1. The selector 10 outputs driving conditions for the heads 2a, 2b, 2c respectively according to an inputted image signal. FIG. 3 shows a table in which driving conditions for the head 2 corresponding to input image signals are written, incorporated in the selector 10. Driving conditions for the heads 2a, 2b, 2c are described in the table. Values written in the table as driving conditions are those used for deciding a voltage of a loaded pulse loaded to the pressure generating element 4, and "0" indicates that the head is not driven. If, for instance, an image signal level for a pixel A is a value of K, the heads 2a and head 2b are selected in FIG. 3, and the value of "20" is selected as driving condition for the head 2a, "18" for the head 2b, and "0" for the head 2c. In this step, in a case where a plurality of heads are selected, ink ejected from each of the selected heads is finally printed one above another at a same position on a receiving medium.

The driving condition outputted from the selector 10 to each of the heads is stored for each head in the memory circuit 11. Driving conditions for the heads stored in the memory circuit are outputted to the driving signal generating circuit 12 according to the start signals 13a, 13b, 13c from the administrating section 7 respectively.

The administrating section 7 makes the motor 8 run and moves the heads 2a, 2b, 2c together in the main scanning direction S. The administrating section 7 detects a movement rate in the main scanning direction of the head 2 by monitoring a rotational angle of the motor 8, and outputs the start signal 13a to the memory circuit 11 so that the administrating section 7 makes the memory circuit 11 output driving condition for the head 2a to the driving signal generating circuit 12 when the head 2a has moves first to a position A where a dot is to be formed on the receiving medium 9. Driving condition for the head 2a is outputted from the memory circuit 11, the driving signal generating circuit 12 generates the driving signal 6a for actually driving the pressure generating element 4a according to the driving conditions outputted from the memory circuit 11 and outputs the driving signal to the head 2a, thus ink being ejected.

Then, when the head 2b has been moved to the position A in FIG. 1 where a dot is to be formed first on the receiving medium 9, the administrating section 7 outputs the start signal 13b to the memory circuit 11, whereby driving condition for the head 2b is outputted to the driving signal generating circuit 12, ink is ejected from the head 2b like in a case of the head 2a, and ink ejected from he head 2a and ink ejected from the head 2b are ejected at the same position A one above another on the receiving medium 9. From this step on, by executing the same operations to the head 2c, ink ejected from a plurality of heads can be printed one above another on a same position on the receiving medium 9.

Then description is made to how to decide driving conditions for the heads 2a, 2b, 2c. FIG. 4 shows a relation between a diameter of a dot to be formed with the ink ejected from the head 2 on the receiving medium 9 and the reflection density then for three different types of ink.

Figure 5:
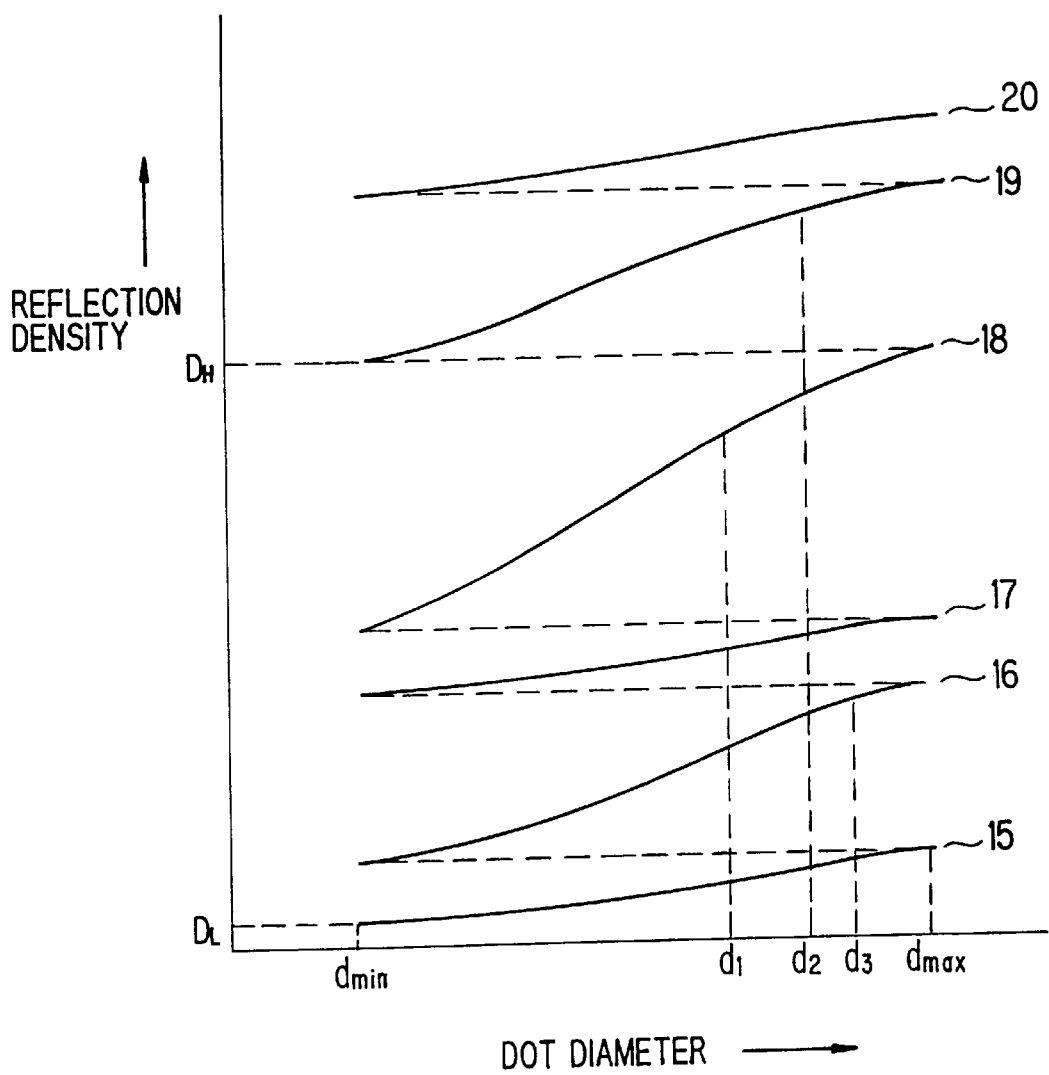
FIG. 5 is an explanatory view showing a method of representing gradations in Embodiment 1 of the present invention.

In this figure, dmin indicates a minimum diameter size of a dot formed with ink ejected from the head 2, and dmax indicates a maximum diameter size of a dot formed with ink ejected from the head 2. Also in the figure, DL indicates a density when a diameter of a dot formed with a first ink having a low density is dmin, and DH indicates a density when a diameter of a dot formed with third ink having a high density is dmax. FIG. 5 shows a relation between a dot diameter obtained in a case when one, two, or three types of ink each having a different density are ejected at a same position one above another and the reflection density. In this figure, designated at the reference numeral 15 is a reflection density in a case where a diameter of a dot formed with first ink is changed, at 16 that in a case where a diameter of a dot formed with second ink is changed, at 17 that in a case where a diameter of a dot formed with second ink 16 is fixed at d3 and dot formed with first ink 15 with the diameter having been changed is printed above the place, at 18 that in a case where a diameter of a dot formed with third ink is changed, at 19 that in a case where a diameter of a dot formed with third ink 18 is fixed at d1, a diameter of a dot formed with third ink 18 is fixed at d1 and a dot with a changed diameter and formed with second ink 16 is printed above it, and at 20 that in a case where a diameter of a dot formed with second ink 16 is fixed at d2 and a dot with a changed diameter and formed with first ink 15 is printed on the same position.

As described above, by printing dots each formed with a different density at a same position, the reflection density for one pixel on a receiving medium can be changed continuously, and further it is possible to print a pixel with a higher density as compared to the highest density DH obtained with a single type of ink. Further, driving conditions for the heads 2a, 2b, 2c are decided according to the combination shown in FIG. 5, and a table 14 incorporated in the selector 10 described above is prepared, thus a printing method with the reflection density continuously changed to one pixel on a receiving medium can be realized.

It should be noted that the d3, at which a diameter of a dot formed with second ink 16 is fixed, is a dot diameter corresponding to a value of the reflection density of the second ink 16 obtained by subtracting a value of the reflection density when a diameter of a dot formed with the first ink is dmin from a value of the reflection density when a diameter of a dot formed with the second ink is dmax. Also dot diameters d1, d2, at which a dot diameter is fixed, are decided according to the similar idea.

With the configuration as described above, it is possible to realize a gradation representing method which does not give any damage to a resolution in an ink jet printer, and a high quality image with many gradation levels can be obtained.

In this embodiment of the present invention, three types of ink each having a different density were used, but any number of types of ink in density may be used, and it is needless to say that this gradation representing method can also be applied to color printing. Also in this Embodiment of carrying the present invention, in a case where three types of ink each having a different density are printed at one position, the description assumes a method in which a diameter of a dot or dots formed with one type of or two types of ink respectively is fixed and a diameter of a dot formed with other type of ink is changed when printed on the same position, but the present invention is not limited to the configuration described above, and a dot diameter to be fixed may be changed by several steps to gradually change the density.

Furthermore, the description of the Embodiment of carrying out the present invention assumed, as an example thereof, a pair of ink jet heads each comprising three heads each ejecting ink having a different density, but two or more pairs of the ink heads may be used to form multi-head configuration, and in this case the ink heads may be arrayed either in the line direction or in the auxiliary scanning direction. With the configuration as described above, a higher speed ink jet printer can be obtained.

Figure 6:
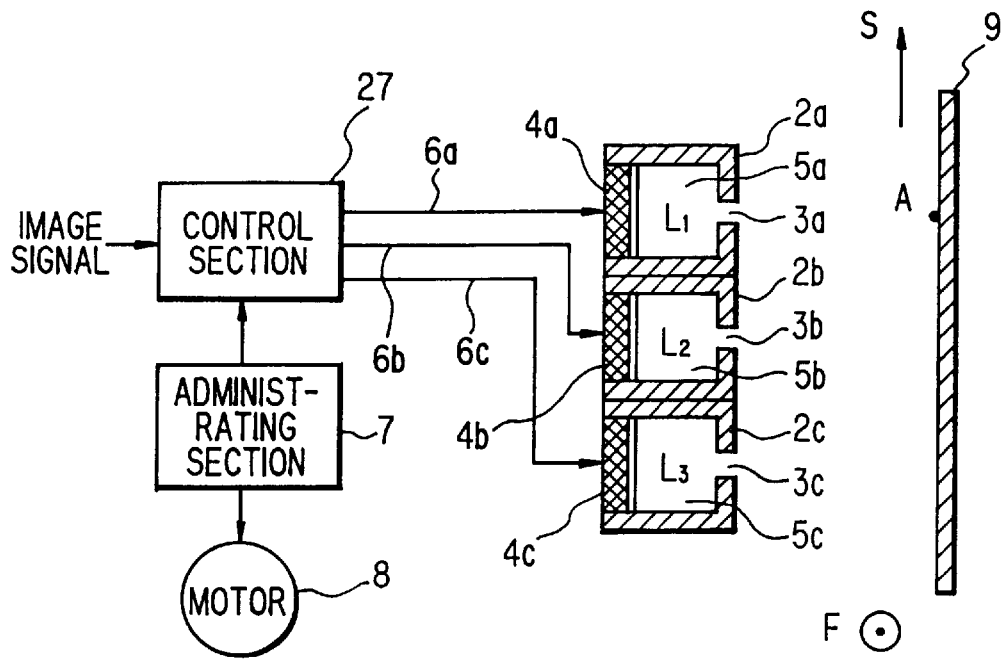
FIG. 6 shows configuration of an ink jet printer in Embodiment 2 of the present invention.

Next, a description is made for Embodiment 2 of the present invention with reference to the related drawings. FIG. 6 shows configuration in this Embodiment 2 of the present invention, and in this figure the reference numeral 27 indicates a control section for generating pulse signals for driving the ink jet heads 2a, 2b, 2c respectively in response to an input image signal and changing a pulse width to control a dot diameter of ink. Other portions of this configuration are the same as those in the Embodiment 1 described above.

Next description is made for operations. A plurality types of ink each having a different density are filled in three ink jet heads (called head herein after) 2a, 2b, 2c. When an image signal is inputted, the control section 27 generates driving signals 6a, 6b, 6c for the heads 2a, 2b, 2c each ejecting ink in response to a signal level for each pixel constituting the image, and outputs the signals to the heads 2. Herein an image signal is defined as expression of a density value for each pixel constituting an image with digital data. The pressure generating elements 4a, 4b, 4c generate pressure corresponding to each of the driving signals 6a, 6b. 6c. A plurality types of ink having the density values of L1, L2, L3 are filled in ink chambers 5a, 5b, 5c of the heads 2a, 2b, and 2c, and the ink is ejected due to pressures generated by the pressure generating elements 4a, 4b, 4c from the ejection nozzles 3a, 3b, 3c respectively to form dots on a receiving medium. Then volume of ink drops is changed by controlling a pulse width of the driving signal 6, thus a diameter of a dot formed on the receiving medium 9 being controlled. Subsequent operations are the same as those in the Embodiment 1 described above. As the pressure generating element 4, there is available an electricity-mechanical movement converting element such as a piezoelectric element or an electricity-heat converting element loading pressure with bubbles.

Figure 7:
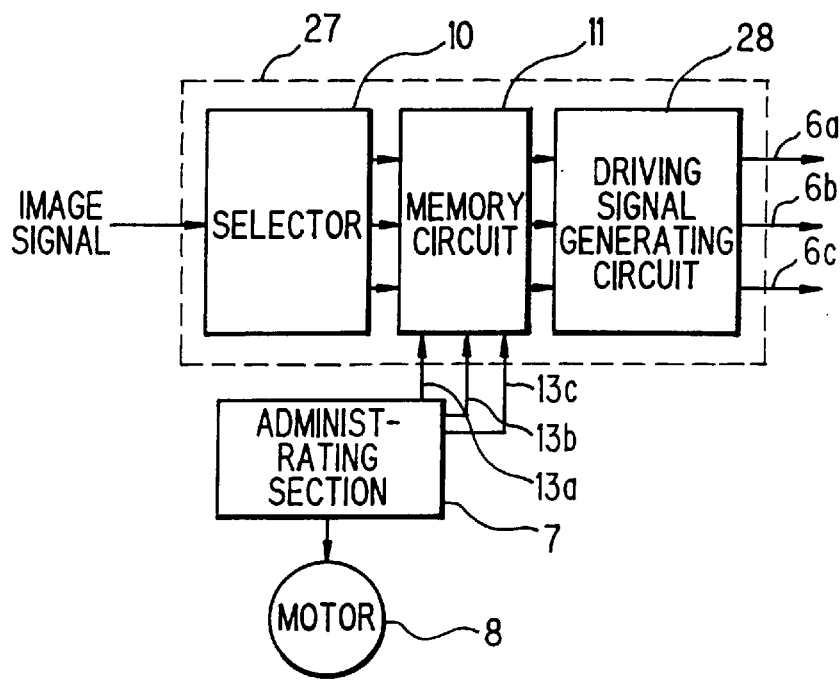
FIG. 7 is a view showing configuration of a control means according to Embodiment 2 of the present invention.

Next description is made for the control section 27 above. FIG. 7 shows an example of configuration of the control section according to the present invention. In this figure, the reference numeral 28 indicates a driving signal generating circuit for generating driving signals 6a, 6b, 6c for driving the pressure generating elements 4a, 4b, 4c, and other portions of the control section are the same as those in Embodiment 1 described above.

Figure 8:
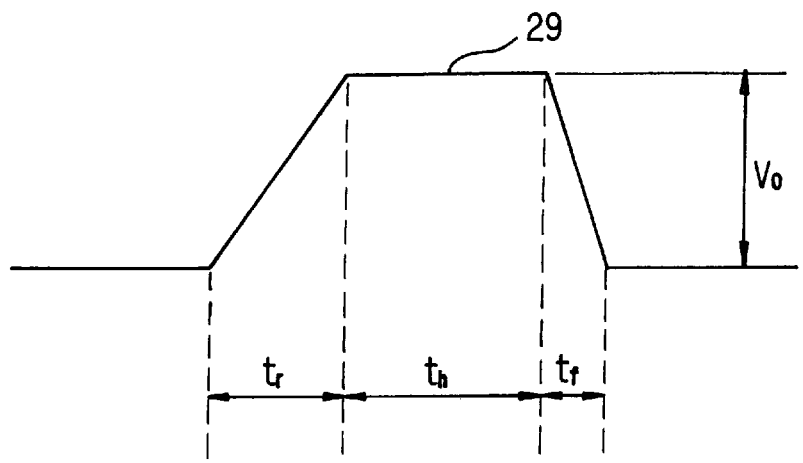
FIG. 8 is an explanatory view showing a waveform of a driving signal in Embodiment 2 of the present invention.
Figure 9:
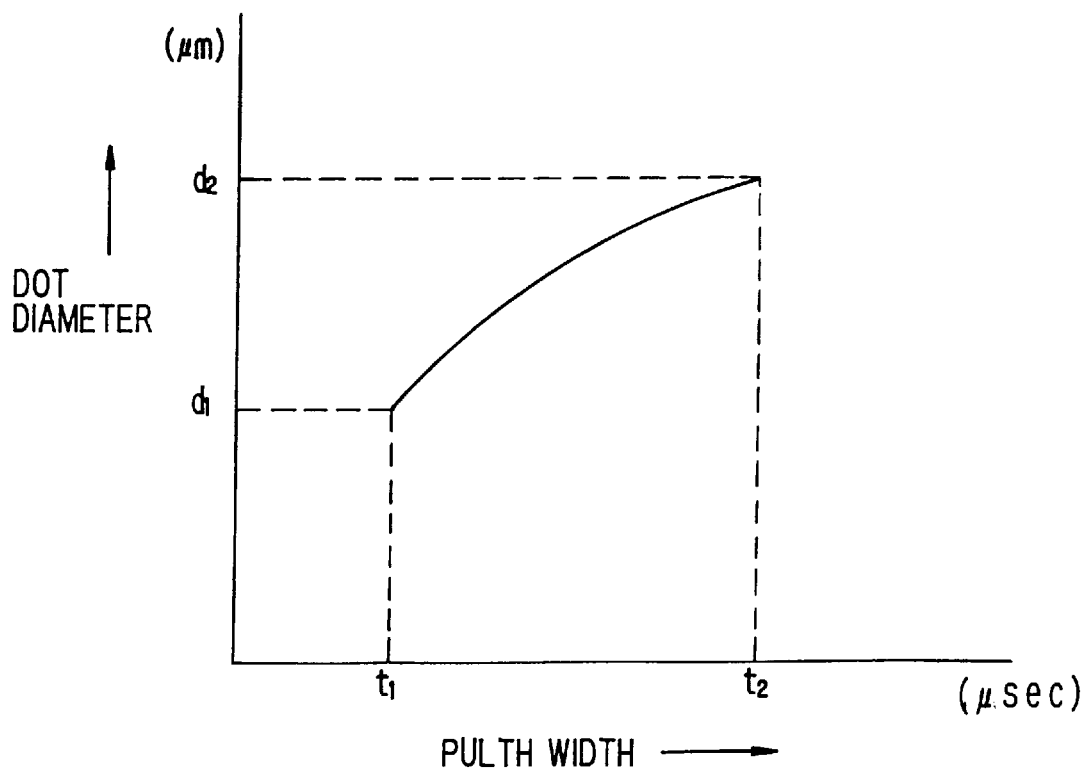
FIG. 9 is a view showing the ejection characteristics in Embodiment 2 of the present invention.

Next description is made for operations in the control section 27. The selector 10 incorporates the table 14 shown in FIG. 3 with the driving conditions for the heads 2a, 2b, 2c each corresponding to an image signal written therein and generates the driving conditions for the heads 2a, 2b, 2c according to an inputted image signal. A value written in the table 14 as a driving conditions is a value for deciding a pulse width of a pulse loaded to the pressure generating element 4, and "0" indicates that the head is not driven. FIG. 8 shows a form of a driving signal inputted into the pressure generating elements 4a, 4b, 4c. In this figure, tr indicates a rise time of a pulse, th indicates a pulse width, and tf indicates a fall time of the pulse. Also V0 indicates a voltage value of the pulse. A voltage value of the driving signal 29 is kept at a constant level, and volume of ink drops ejected from the head 2 is changed by changing a length of the pulse width th, and also a diameter of a dot formed on the receiving medium 9 is changed. FIG. 9 shows the ejection characteristics of this ink jet head. In this step, a condition is that a piezoelectric element is used as the pressure generating element 4 and a voltage value of the driving signal is kept constant. In a range from t1 to t2, the characteristics curve becomes gradually higher, which indicates that a diameter of a dot can be controlled by controlling a pulse width. Subsequent operations are the same as those in Embodiment 1 described above.

As described above, in this Embodiment of carrying out the present invention, a diameter of a dot is changed by changing a pulse width of a driving signal, so that a density gradation method not giving damages to the resolution can easily be realized.

Figure 10:
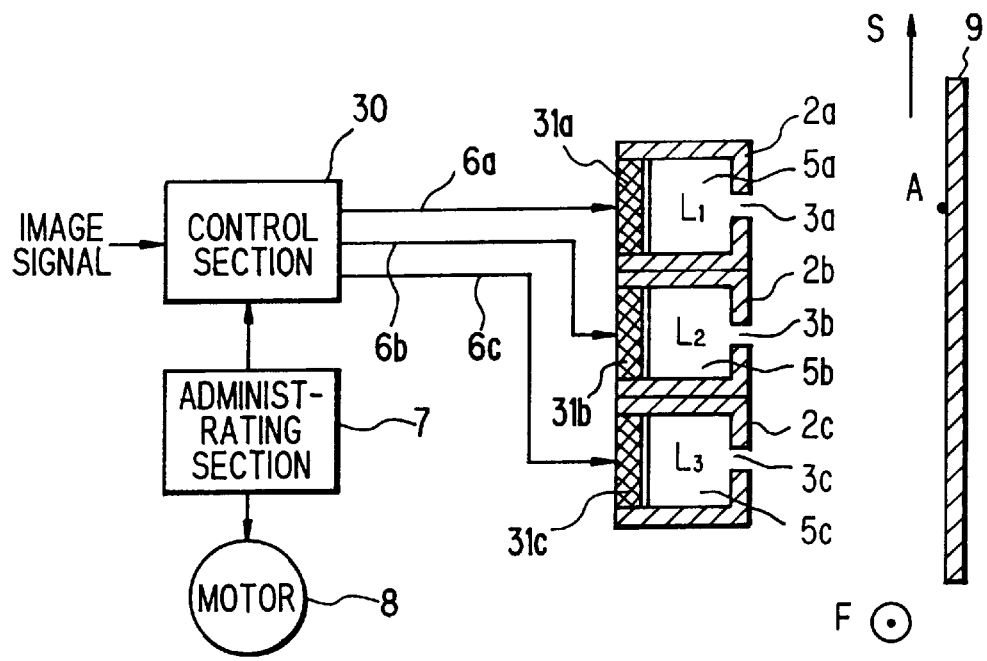
FIG. 10 shows configuration of an ink jet printer in Embodiment 3 of the present invention.

Next description is made for Embodiment 3 of the present invention with reference to the related drawings. FIG. 10 is a figure showing configuration in Embodiment 3 of the present invention, and in this figure the reference numerals 2a, 2b, 2c indicates ink jet heads comprising the ejection nozzles 3a, 3b, 3c, and piezoelectric elements 31a, 31b, 31c as pressure generating elements, and ink chambers 5a, 5b, 5c respectively, and the reference numeral 30 indicates a control section generating signals for driving the ink jet heads 2a, 2b, 2c in response to an inputted image signal, another portions of the configuration are the same as those in Embodiment 1 described above.

Next description is made for operations in this embodiment. A plurality types of ink each having a different density are filled in three ink jet heads (called head hereinafter) 2a, 2b, 2c. When an image signal is inputted, the control section 30 generates driving signals 6a, 6b, 6c for the heads 2a, 2b, 2c ejecting ink in response to a signal level for each pixel constituting an image and outputs the signals to each head 2.

Herein the image signal is defined as an expression of a density value for each pixel constituting an image with digital data. The piezoelectric elements 31a, 31b, 31c generate pressures corresponding to the driving signals 6a, 6b, 6c. A plurality of ink each having a different density value of L1, L2, L3 respectively are filled in the ink chambers 5a, 5b, 5c in the heads 2a, 2b, 2c, and the ink is ejected due to pressures generated by the piezoelectric elements 31a, 31b, 31c from the ejection nozzles 3a, 3b, 3c respectively, thus dots being formed on the receiving medium 9. In this step, volume of ink drops ejected is changes by controlling a rise time of the driving signal 6, thus a diameter of a dot formed on the receiving medium 9 being controlled. The subsequent operations are the same as those in Embodiment 1 described above.

Figure 11:
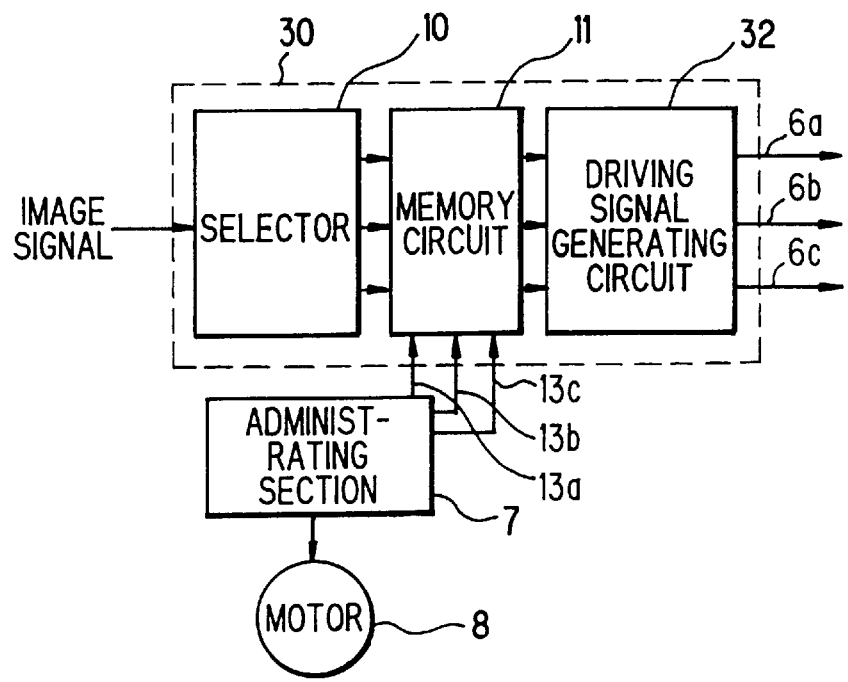
FIG. 11 is a view showing configuration of a control means in Embodiment 3 of the present invention.

Next description is made for the control section 30. FIG. 11 shows an example of configuration of the control section according to the present invention. In this figure, the reference numeral 32 indicates a driving signal generating circuit generating driving signals 6a, 6b, 6c for driving the piezoelectric elements 31a, 31b, 31c, and other portions of the configuration are the same as those in Embodiment 1.

Figure 12:
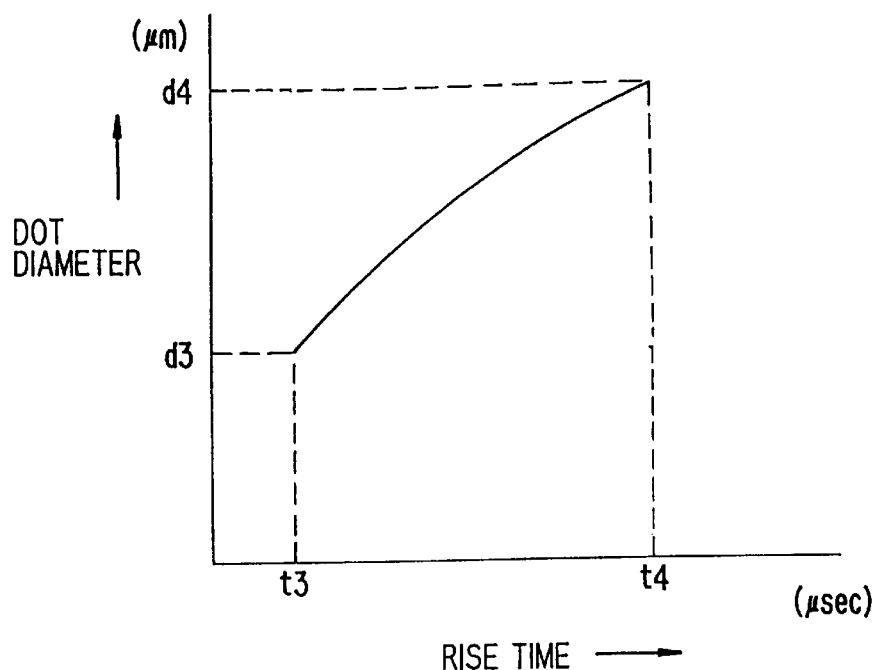
FIG. 12 is a view showing the ejection characteristics in Embodiment 3 of the present invention.

Next description is made for operations in the control section 30. The selector 10 incorporates the table 14 shown in FIG. 3 with driving conditions for the heads 2a, 2b, 2c each corresponding to each image signal written therein, and outputs the driving conditions for the heads 2a, 2b, 2c in response to an inputted image signal. A value written in the table 14 as a driving condition is a value used to decide a rise time of a pulse loaded to each of the piezoelectric elements 31a, 31b, 31c, and "0" indicates that the head is not driven. FIG. 8 indicates a form of a driving signal inputted into each of the piezoelectric elements 31a, 31b, 31c. In this figure, tr indicates a rise time of a pulse, th indicates a pulse width, and tf indicates a fall time thereof. Also V0 indicates a voltage value of a pulse. A voltage value of the driving signal 29 is kept at a constant level, and volume of ink drops ejected from the head 2 is changed by changing a duration of a rise time tr of a pulse, thus a diameter of a dot formed on a receiving medium being changed. FIG. 12 shows the ejection characteristics of the ink jet head according to the present invention. A voltage value of the driving signal is fixed at a constant value. In the range from t3 to t4, the characteristics curve gradually rises, and it can be understood that a diameter of a dot can be controlled by controlling a rise time.

The subsequent operations are the same as those in Embodiment 1 of the present invention.

As described above, in this embodiment of the present invention, a piezoelectric element is used as a pressure generating element, and a diameter of a dot is controlled by changing a rise time of a driving signal, so that a density gradation representation not spoiling the resolution can easily be realized.

Figure 13:
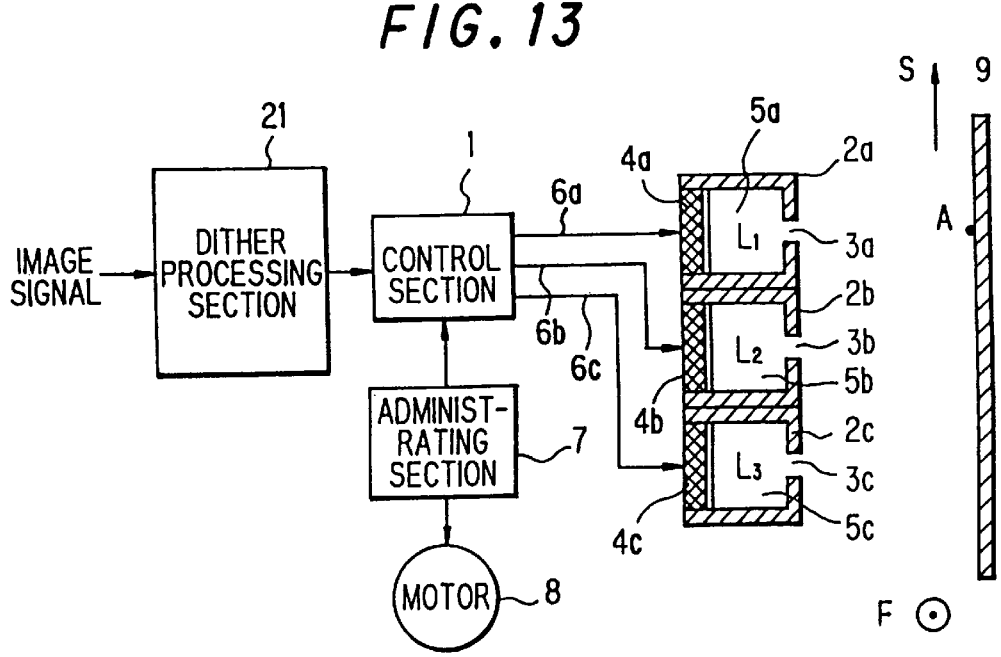
FIG. 13 is a view showing configuration of an ink jet printer in Embodiment 4 of the present invention.

Next description is made for Embodiment 4 of the present invention with reference to the related drawings. FIG. 13 shows Embodiment 4 of the present invention, and in this figure the reference numeral 21 indicates a dither processing section as a gradation converting means for subjecting an input image signal to ordered dither processing, and other portions of the configuration are the same as those in Embodiment 1 described above.

With the ink jet printer shown in Embodiment 1 of carrying out the present invention, a gradation method not spoiling the resolution can be realized, and a high quality image with many gradation levels can be obtained. However, as three types of ink are used for one color in the gradation method described above, when applied, for instance, to a color ink jet printer using four colors of yellow, magenta, cyan, and black, 12 types of ink are required, which will result in increase of the cost. To obtain a low cost printer, use of fewer types of ink is desirable, but in that case, as a number of combinations of types of ink printed one above another at one position also becomes fewer, and it becomes difficult to set a larger number of gradation levels for one dot, which in return makes it impossible to obtain a high quality image.

In a case where a number of types of ink is small, input image signal is subjected to digital halftoning processing to obtain a printed image with many gradation levels. The digital halftoning processing includes ordered dither processing, error diffusion processing, and dot pattern processing. In this Embodiment 4 of carrying out the present invention, the ordered dither processing is executed as the digital halftoning processing, and next description is made for operations in the processing. A plurality types of ink each having a different density are filled in the three ink jet heads (described head hereinafter) 2a, 2b, 2c. When an image signal is inputted, the dither processing section 21 subjects the image signal to a multi-level dither processing to covert it to a gradation signal, and outputs the gradation signal. Herein the image signal is defined as expression of a density data for each pixel constituting an image with digital data, and the gradation signal expresses a printing level obtained for one dot on the receiving medium 9. When the gradation signal is inputted into the control section 1, the control section 1 generates the driving signals 6a, 6b, 6c for the heads 2a, 2b, 2c in response to a signal level for each pixel constituting the image, and outputs the driving signals to the heads 2a, 2b, 2c. The subsequent operations are the same as those in Embodiment 1 described above.

Figures 14, 15:
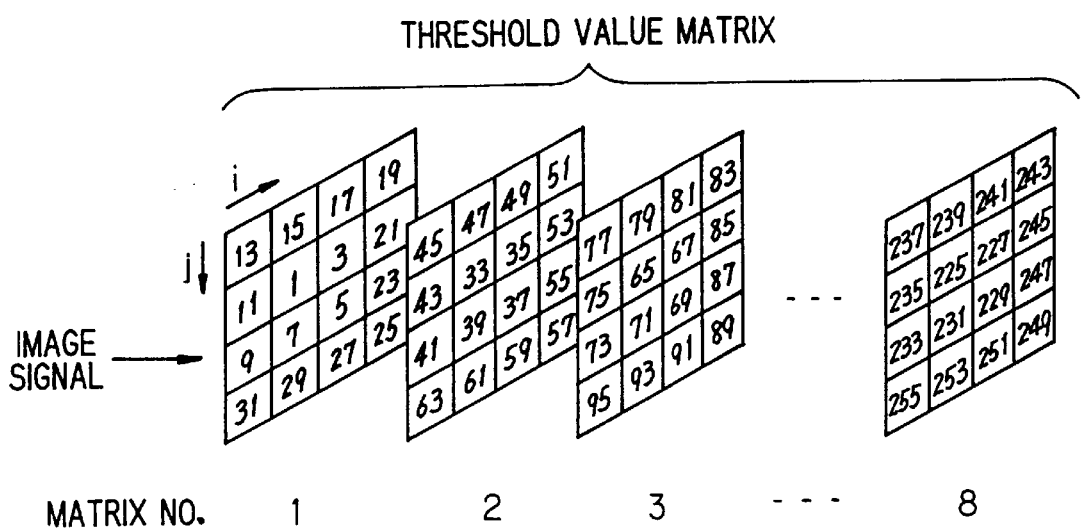
FIG. 14 is a view showing an example of a dither matrix in Embodiment 4 of the present invention.
FIG. 15 is an explanatory view showing a dither processing method in Embodiment 4 of the present invention.

Then description is made for a case, as an example, where two types of ink for same color each having a different density are used and multi-level dither processing, in which a number of gradation levels for one dot obtained by printing different types of ink at one position, is executed. FIG. 14 shows an example of a dither matrix used in this processing, which is a 4×4 pixel pattern. In a case of bi-level system, 16 gradation levels can be represented only by using this matrix, but as 8 gradation levels can be obtained for one dot, totally 16×8 =128 gradation levels can be represented. FIG. 15 is an explanatory view for explanation of a method of executing the dither processing described above in the dither processing section 21. The dither processing section 21 has dither threshold value matrixes No. 1 to No. 8 shown in FIG. 15. In case of an image signal with the coordinates (i, j), the coordinate values are compared to a dither threshold value b1 for the same coordinates in the matrix No. 1, and if the coordinate of the image signal is not less than the dither threshold value b1, the image signal is passed through the matrix 1, and then is compared to a dither threshold value b2 of the matrix No. 2. This operation is executed successively, and a matrix number, which the image signal passes through last, is given as a gradation signal to the image signal, and the gradation signal is outputted to the control section 1, and because of this scheme an image can be printed with 128 gradation levels.

With the configuration as described above, even in a case where a number of types of used ink is small, it is possible to print an image with many yet smoothly changing gradation levels, and there are merits not only that a high quality image can be obtained, but that, as a number of gradation levels for one dot can be reduced, a circuit scale can be made smaller and a low cost ink jet printer can be obtained.

Description of Embodiment 4 of the present invention assumes a case of 4×4 dither matrix, but the matrix size is not limited to the above case, and the size in the vertical direction may be different from that in the horizontal size. Also a ordered dither for a pattern different from that in this Embodiment or a dot pattern or a multi-level error diffusion may be used. Further the more gradation levels for one dot, the better, and in this case, not only a printed image with more gradation levels can be obtained, but also matrix size can be made smaller, which enables image printing without spoiling the resolution.

Figure 16:
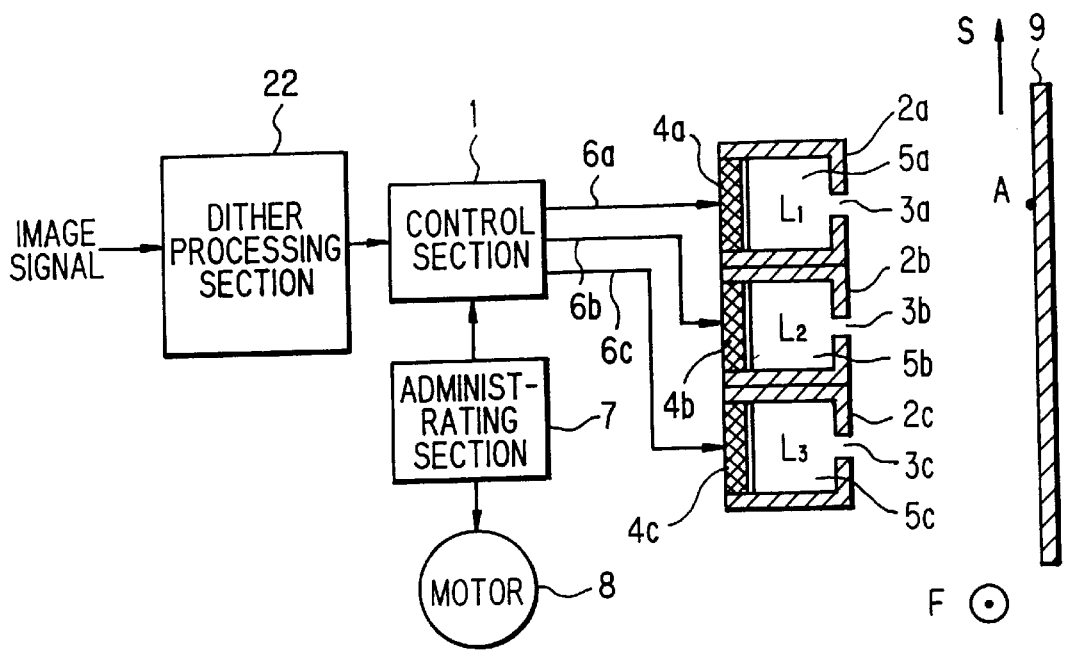
FIG. 16 is a view showing configuration of an ink jet printer in Embodiment 5 of the present invention.

Next description is made for Embodiment 5 of carrying out the present invention with reference to the related drawings. FIG. 16 shows configuration in Embodiment 5 of carrying out the present invention, and in this figure the reference numeral 22 indicates a dither processing section as a gradation converting means for detecting pixels included in a low density area for an input image signal and executing ordered dither processing to the detected pixels, and the output is inputted into the control section 1. Other portions of the configuration are the same as those in Embodiment 1.

With the ink jet printer shown in Embodiment 1, a gradation method can be realized without spoiling the resolution, and a high quality image with many gradation levels can be obtained. However, in the gradation method described above, printing cannot be executed to pixels included in a low density area. It is understood from FIG. 4 that, if first ink with low density is used and a density value in a case where the dot diameter is the minimum one, namely dmin, is DL, as the dot diameter can not be made further smaller, a dot can not be formed to a pixel included in an area with a density lower than the density value DL.

So in Embodiment 5, to pixels included in an area with a density lower than the density value DL, an input image signal is subjected to digital halftoning dither processing for printing. As the digital halftoning processing, there are available the ordered dither processing, error diffusion processing, and dot pattern processing, but in the Embodiment 5 of carrying out the present invention, the ordered dither processing is executed, so that description is made for operations in the ordered dither processing below. A plurality of ink each having a different density are filled in the three ink jet heads (called head hereinafter) 2a, 2b, 2c. When an image signal is inputted, the dither processing section compares a density value for the image signal to a threshold value stored therein, executes ordered dither processing to an image signal with a density value less than the threshold value, and gives data specifying whether a dot is formed to the pixel or not as a gradation signal. "1" is outputted when a dot is formed, and "0" when a dot is not formed. To a signal with a density value larger than the threshold value, the dither processing section 22 outputs the image signal as it is as a gradation signal. When the gradation signal is inputted into the control section 1, the control section 1 generates driving signals 6a, 6b, 6c for the heads 2a, 2b, 2c for ejecting ink in response to a signal level for each pixel constituting an image, and outputs the driving signals to the heads 2a, 2b, 2c. The subsequent operations are the same as those in Embodiment 1.

Figure 17:
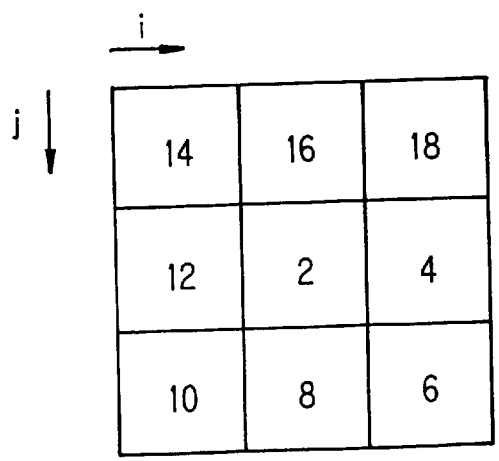
FIG. 17 is a view showing an example of a dither matrix in Embodiment 5 of the present invention.

Next description is made for the ordered dither processing. Using a value corresponding to the density value DL as a threshold value, the dither processing section 22 compares a density value of the input image signal to the threshold value. For instance, if a threshold value corresponding to the density value DL is "18", ordered dither processing is executed to image signals each with a density value not more than the threshold value "18", and signals each having a density value larger than "18" are outputted as they are. FIG. 17 shows a 3×3 dither matrix in a case where dither processing is executed. By using this matrix, it is possible to express 9 gradation levels. To image signals each having a density value of "18" or below, dither processing is executed using the dither threshold value shown in FIG. 17, and only data concerning whether a dot should be formed or not for the pixel is given as a gradation signal. When a dot is to be formed for the pixel, data of "1" is outputted, and when a dot is not to be formed for the pixel, data of "0" is outputted.

Next, in case where a gradation signal outputted from the dither processing section 22 is "1", first ink with a low density as shown in FIG. 4 is used, and a dot with the minimum dot diameter of dmin is formed on a receiving medium. A table with two driving conditions for the head 2 each corresponding to a gradation signal is incorporated in the selector 10, but this table is replaced with a table 23 shown in FIG. 18. Assuming that a head ejecting first ink with low density is the head 2a, a driving condition of "1" for the minimum dot diameter is set for a portion of the head 2a according to the gradation signal of "1" in the table 23, and "0" is set to all other portions in a range of gradation signal of "0" to "18". The subsequent operations in the selector 10 are as described above, and a dot is formed without fail to a pixel having been subjected to the dither processing.

With the configuration as described above, even to pixels included in a low density area which can not be reproduced only by changing a dot diameter and ejecting a plurality types of ink each having a different density one above another at one position, a gradation image can be printed, which makes it possible to realize an image printer which can reproduce a broader density range with more gradation levels.

Description of Embodiment 5 assumes a case of a 3×3 dither matrix, but the dither matrix is not limited to this, and a matrix with size in the vertical direction different from that in the horizontal direction may be used. Also ordered dither for a pattern different from that in the above description of a dot pattern or error diffusion may be used.

Next description is made for Embodiment 6 of the present invention with reference to the related drawings. FIG. 19 shows configuration in Embodiment 6, and in this figure, designated at the reference numeral 24 is an image distinguishing section for making distinction as to whether an input image signal is for a character/illustration or for a natural picture, at 26 a distinction signal indicating to which of a character/illustration or a natural picture the image signal determined in the image distinguishing section 24 belongs, at 65 an image signal having passed through the image distinguishing section 24, at 25 a dither processing section as a gradation converting means for executing ordered dither processing to the image signal, and other portions of the configuration are the same as those in Embodiment 1.

Next description is made for operations. A plurality types of ink each having a different density are filled in the three ink jet heads (called head hereinafter) 2a, 2b, 2c. When an image signal is inputted, distinction is made as to whether the inputted image signal is for a pixel constituting a character/illustration section or for a pixel constituting a natural picture section. Herein the image signal is defined as expression of a density value for each pixel with digital data. Any common method may be used for this distinction, and for instance, a 3×3 pixel matrix is used, a change rate of a density value for a pixel within the matrix is computed, and if the change rate is larger than a threshold value, the pixel is determined as constituting a character/illustration section, and other wise the pixel is determining as constituting a natural picture section. A result of the distinction is outputted as a distinction signal 26. The distinction signal 26 is outputted as a state signal, and "1" is outputted if the image signal is for a character/illustration section, and "0" when the image signal is for a natural picture section. When an image signal 65 is inputted into the dither processing section 25, the image signal 65 is subjected to multi-level dither processing to covert the image signal to a gradation signal, and the gradation signal is outputted. There are two types of dither matrix each having a different pattern as shown in FIG. 20 in the dither processing section 25, and FIG. 20A shows a dither matrix for character/illustration, and FIG. 20B shows a dither matrix for a natural picture. The dither processing section 25 executes dither processing and outputs a gradation sinal using the dither matrix shown in FIG. 20A if the distinction signal 26 outputted from the image distinguishing section 24 is "1" and dither matrix shown in FIG. 20B if the distinction signal is "0". When a gradation signal is inputted into the control section 1, the driving signals 6a to 6c for the heads 2a to 2c each ejecting ink according to a signal level for each pixel constituting an image are generated and outputted to the head 2. The subsequent operations are the same as those in Embodiment 4.

With the configuration as described above, the dither processing suited to a character/illustration or a natural picture can be executed, and an ink jet printer which can provide higher quality images can be realized.

Description of Embodiment 6 above assumed a case of a 4×4 dither matrix, but the matrix size is not limited to this one, and a matrix with vertical size different from the horizontal size may be used. Also ordered dither for a pattern different from that in this Embodiment may be used. Further, the more gradations for one dot, the better, and in this case, not only an image with more gradation levels can be obtained, but the matrix size can be made smaller, and an image can be printed without spoiling the resolution.

Next description is made for Embodiment 7 of the present invention with reference to the related drawing. FIG. 21 shows configuration in this Embodiment 7 of carrying out the present invention, and in this figure, designated at the reference numeral 36 is an ink jet head as an ink ejecting means comprising an ejection nozzle 37, a pressure generating element 38 and an ink chamber 39, at 33 an image distinguishing section for making distinction as to whether an input image signal is for a character/illustration or for a natural picture, at 45 is a distinction signal indicating to which of a character/illustration and a natural picture the image signal determined in the image distinguishing section 33 belongs, at 65 an image having passed through the image distinguishing section 33, at 34 a dither processing section for executing ordered dither processing to the image signal 65, at 35 a control section for generating a driving signal 40 for driving an ink jet head 36 in response to an image signal having been subjected to dither processing, at 42 a motor as a driving means for moving the ink jet head, at 41 an administrating section for controlling the control section 35 as well as the motor 42, at 43 a receiving medium, and at 44a, 44b start signals from the administrating section 41 for giving timing for ejecting ink to the heads for the purpose to print ink ejected from the head 36 one above another at one position on a receiving medium 43.

Next description is made for operations. Ink is filled in the ink jet head (called head hereinafter) 36. When an image signal is inputted, the image distinguishing section 33 makes distinction as to whether the inputted image signal is for a pixel constituting a character/illustration section or for a pixel constituting a natural picture section. Herein the image signal is defined as expression of a density value for each pixel constituting an image with digital data. As a method of distinction, any common method may be used, and for instance, a 3×3 pixel matrix is used, a change rate of a density value for a pixel within the matrix is computed, and if the change rate is larger than a threshold value, the pixel is regarded as for a character/illustration section, and otherwise as for a natural picture section. A result of the distinction is outputted as a distinction signal 45. The distinction signal 45 is outputted as a state signal, and "1" is outputted if the image signal is for a character/illustration section, and "0" is outputted if the image signal is for a natural picture section. Also the image distinguishing section 33 passes through the image signal as it is and output the image signal to the dither processing section 34. Then, when an image signal 65 is inputted into the dither processing section 34, a multi-level dither processing is executed to the image signal 65. In the dither processing section 34, there are two types of dither matrix each having a different pattern as shown in FIGS. 20A and 20B, and FIG. 20A shows a dither matrix for character/illustration, and FIG. 20B shows a dither matrix for a natural picture. The dither processing section 34 executes dither processing by using the matrix shown in FIG. 20A if the distinction signal 45 outputted from the image distinguishing section 33 is "1", and also using the dither matrix shown in FIG. 20B if the distinction signal 45 is "0".

When an image signal having been subjected to dither processing is inputted into the control section 35, the control section 35 generates a driving signal 40 for the head 36 ejecting ink according to a signal level for each pixel constituting an image, and outputs the driving signal 40 to the head 36. The pressure generating element 38 generates a pressure corresponding to the driving signal 40. Ink having a density value of L1 is filled in the ink chamber 39 in the head 36, and the ink is ejected due to the pressure generated by the pressure generating element 38 from the ejection nozzle 37, and a dot is formed on a receiving medium 43. Then volume of ejected ink drops is changed by controlling a voltage of the driving signal 40, thus a diameter of a dot formed on the receiving medium 43 being controlled.

It should be noted that any type of pressure generating element 38 may be used provided that it can load pressure to ink, and like in Embodiment 1 described above, there is available an electricity-mechanical movement converting element such as piezoelectric element or an electricity-heat converting element which loads pressure with bubbles generated when the ink in the ink chamber is heated.

FIG. 22 shows a table 46 with driving conditions for the head 36 written therein, incorporated in the control section 35, for outputting a driving signal 40 to the head 36 in response to an image signal having been subjected to dither processing. In this table 46, for instance, a driving condition for the head 36 is written in a case where dots each having a different diameter are printed one above another once. The value written as a driving condition is used for deciding a voltage loaded to the pressure generating element 38, and "0" indicates that the head is not driven. The control section 35 generates a driving signal 40 according to this driving condition. For instance, if a signal level for a pixel A after dither processing is K, in FIG. 22, the head 36 ejects ink in the first printing according to the driving condition of "20", and in the second printing according to the driving condition of "10". And each lot of ink ejected in each time are finally printed one above another at one position on the receiving medium.

The administrating section 41 makes the motor 42 run and moves the head 36 in the direction S (called main scanning direction). The administrating section 41 detects a movement rate of the head 36 in the main scanning direction by monitoring a rotational angle of the motor 42, and, when the head 36 has moved on the receiving medium to a position A where a dot is to be formed first, the administrating section 41 outputs a start signal 44a to the control section 35 so that the control section 35 outputs first driving signal for the head 36. The control section 35 generates a driving signal 40 for actually driving the pressure generating element 38 according to the start signal 44a and outputs the driving signal 40 to the head 36 to make it eject ink, and executes first image printing by one line in the direction S.

When the first image printing comes to the end, the administrating section 41 makes the motor 42 rotate in the reverse direction, returns the head 36 to the original position, and again moves the head in the main scanning direction. When the head 36 has been moved on the receiving medium to the position A where a dot is to be formed first, the administrating section 41 outputs a start signal 44b to the control section 35. The image signals after dither processing for one line are stored in the control section 35, a second time driving signal for the head 36 according to the same image signal is outputted, and like in the first time ink is ejected from the head 36, ink ejected from the head 36 first time and ink ejected from the head 36 second time are printed one above another at the same position, thus printing for one line being finished.

Next the administrating means 41 feeds the receiving medium 43 by one line in the direction F (called auxiliary scanning direction) vertical to the direction S in which the head 36 scans with the motor (not shown) for moving the receiving medium, executes printing for the next one line according to the same operational sequence as that described above, and repeats the operations until printing for all lines is complete.

The above description assumes a method in which, for printing ink one above another at the same position, printing is executed by scanning the same line twice, but as image signals for one line are stored in the control section 35, the configuration is allowable in which the head is not returned to the original position and the second printing is executed in a direction reverse to that in the first printing. Also the configuration is allowable in which two heads with the same ink filled therein respectively are arrayed in the main scanning direction so that two lots of ink are ejected one above another at the same position in one scan.

Figure 23:
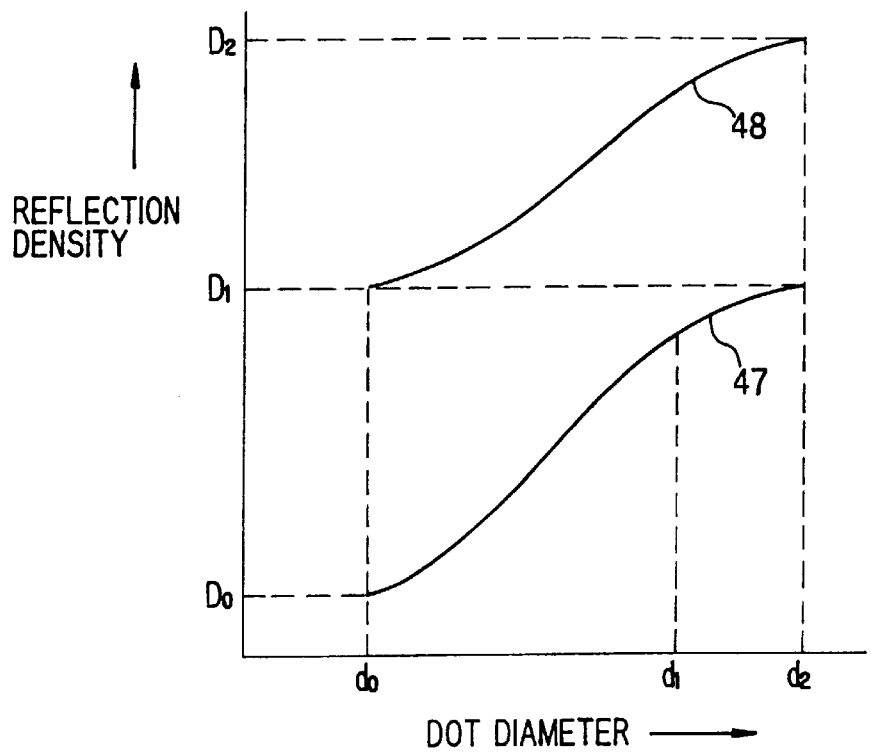
FIG. 23 is an explanatory view showing a method of representing gradation levels in Embodiment 7 of the present invention.

Next description is made for how to decide a driving condition for the head 36. FIG. 23 shows a relation between a diameter of a dot formed with the ink ejected from the head 36 on the receiving medium 43 as well as a diameter of a dot obtained when the same ink is ejected on the previous dot and a reflection density. In the figure, designated at the reference numeral 47 is a reflection density in a case where a diameter of a dot is changed by ejecting a single type of ink, and at 48 that in a case where a diameter of a dot formed by ink ejected first is fixed at d1 and a dot formed with the same ink but having a different diameter is overlaid on the dot formed first. As described above, by printing dots each having a different diameter at one position, the reflection density in a range from D0 to D2 can be reproduced in a dot diameter range from d0 to d2, and thus a pixel having a higher density as compared to the highest density D1 obtained with a single type of ink can be printed. By deciding a driving condition for the head 36 according to the combination as shown in FIG. 23 and preparing the table 46 incorporated in the control section 35, it is possible to eject ink with the same density for a pixel at one position on a receiving medium with a different dot diameter and print an image changing the reflection density.

It should be noted that d1, at which a dot diameter is fixed, is a dot diameter corresponding a value of reflection density obtained by subtracting a value of reflection density when a dot diameter is dmin from a value of reflection density when a dot diameter is dmax.

Next description is made for the dither processing. As an example, description is made for a case where 8 gradation levels can be obtained by printing dot formed with ink having the same density but having a different dot diameter at one position on a receiving medium. As described above, the dither processing section 34 executes multi-level dither processing to an input image signal. As described above, the image distinguishing section 33 makes distinction as to whether an input image signal is for a character/illustration or for a natural picture, and if the image distinguishing section 33 has determined that a pixel B is a pixel constituting a natural picture section, the image distinguishing section 33 outputs a distinction signal 45 of "0". The dither processing section 34 selects the dither shown in FIG. 20B according to the distinction signal 45 and executes dither processing. In a case of vi-level dither processing, 16 gradation levels can be represented only by using this matrix, but as described above 8 gradation levels can be obtained for one dot, so that totally 16×8=128 gradation levels can be represented. The dither processing section 34 has the dither threshold value matrixes No. 1 to No. 8 as shown in FIG. 15 like in Embodiment 4 described above. A density value of an image signal with the coordinates (i, j) is compared to a dither threshold value b1 for the same coordinates in the matrix No. 1, and if a density value of the image signal is not less than the dither threshold value b1, the image signal is passed through matrix 1, and then the density value is compared to a dither threshold value b2 in the matrix No. 2. This operation is successively executed, and a matrix number, which the image signal passes through finally, is given as an image signal to the pixel, and the image signal is outputted to the control section 35, and thus an image can be printed with 128 gradation levels.

With the configuration as described above, in an ink jet printer which uses ink having the same density and prints dots changing the dot diameter at one position, it is possible to print an image with many and smooth gradation levels, and not only a high quality image can be obtained, but also a number of gradation levels for one dot can be reduced, so that a circuit scale can be made smaller and a low cost ink jet printer can be obtained. Also dither processing suited to a character/illustration or a natural picture can be executed, and an ink jet printer, which can provide a higher quality image, can be obtained.

The description of this Embodiment above assumed a case of a 4×4 dither matrix, but the matrix size is not limited to this one and a matrix with size in the vertical direction different from that in the horizontal size may be used, and also ordered dither for a pattern different from that in this Embodiment may be used. Also the above description assumes a case where dots formed with ink having the same density are printed one above another once changing a dot diameter, but the time of printing one above another is not limited once, and there are provided the advantages that, the more gradations are obtained for one dot, not only an image with more gradations can be obtained, but also the smaller the matrix size can be made, and that image printing can be executed without spoiling the resolution.

Figure 24:
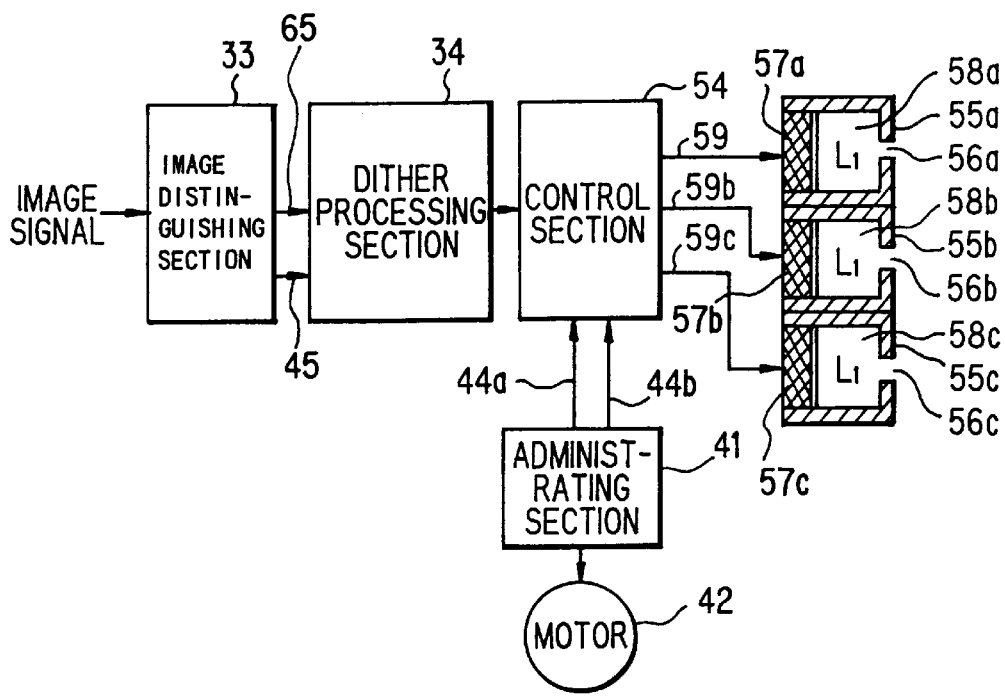
FIG. 24 is a view showing configuration of an ink jet printer in Embodiment 8 of the present invention.

Next description is made for Embodiment 8 of the present invention with reference to the related drawings. FIG. 24 shows configuration in Embodiment 8, and designated at the reference numbers 55a, 55b, 55c are ink jet heads as an ink ejecting means comprising ejection nozzles 56a, 56b, 56c, pressure generating elements 57a, 57b, 57c, and ink chambers 58a, 58b, 58c respectively, and as shown in FIG. 25, the ejection nozzles 56a, 56b, 56c are arrayed in a direction vertical to the direction S (main scanning direction) in which the head 55 moves, and ink having the same density L1 is filled in the ink jet heads (called head) 55a, 55b, 55c.

Figure 25:
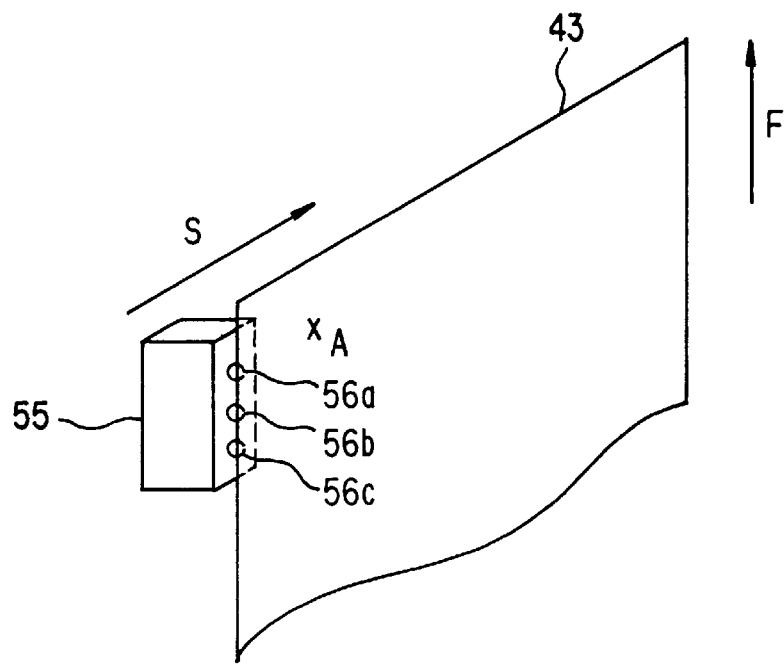
FIG. 25 is a view showing arrangement of a plurality of heads and directions in which the head and receiving medium move in Embodiment 8 of the present invention.

It should be noted that FIG. 25 is an explanatory view showing a direction in which the head 55 with three pieces of heads 55a, 55b, 55c is moved and a direction in which a receiving medium 64 moves.

In this figure, the reference numeral 54 indicates a control section generating driving signals 59a, 59b, 59c for driving the heads 55a, 55b, 55c in response to an image signal having been subjected to dither processing from the dither processing section 34, and the control section stores image signals for three lines in the direction F (auxiliary direction) in FIG. 25, outputs a driving signal 59a to the heads 55a for printing a first line, a driving signal 59b to the head 55b for printing a second line, and a driving signal 59c to the heads 55c for printing a third line, and provides controls so that printing for the three lines is executed simultaneously. Other portions of this configuration are the same as those in Embodiment 7 shown in FIG. 21.

Next description is made for operations. When an image signal is inputted, the image distinguishing section 33 and the dither processing section 34 execute operations similar to those in Embodiment 7, and output the image signal having been subjected to dither processing to the control section 54.

When the image signal 65 having been subjected to dither processing is inputted into the control section 54, the control section 54 generates driving signals 59a, 59b, 59c for the heads 55a, 55b, 55c ejecting ink according to a signal level for each pixel constituting an image, and outputs the driving signals to the head 55. The pressure generating elements 57a, 57b, 57c generates pressure corresponding to the driving signals 59a, 59b, 59c, and ink is ejected from the ejection nozzles 56a, 56b, 56c due to pressure generated by the pressure generating elements 57a, 57b, 57c, thus dots being formed on a receiving medium. Then volume of ejected ink drops is changed by controlling a voltage of the driving signal 59, thus a diameter of a dot formed on a receiving medium being controlled.

It should be noted that, as the pressure generating element 57, the electricity-mechanical movement converting element or electricity-heat converting element like that in Embodiment 1 is used.

The control section 54 incorporates the table 46 shown in FIG. 22 to output driving signals 59a, 59b, 59c for the head 55 according to an image signal from the dither processing section 34 like in Embodiment 7, and executes the same operations as those in Embodiment 7 to control volume of ink drops ejected from the heads 55a, 55b, 55c first time and second time.

The administrating section 41 moves the head 55 in the main scanning direction like in Embodiment 7, and when the head 55 has been moved to the position A shown in FIG. 25 at which a dot is to be formed first on a receiving medium, the administrating section 41 outputs a start signal 44a to the control section 54 so that first driving sections are outputted to the heads 55a, 55b, 55c. The control section 54 generates the driving signals 59a, 59b, 59c based on the table 46 for actually driving the pressure generating elements 57a, 57b, 59c according to the start signal 44a, outputs the driving signals to the heads 55a, 55b, 55c to make them eject ink, and executes first time image printing for three lines.

When first image printing is finished, the control section 54 executes similar operations like those in Embodiment 7 and outputs second driving signals for the head 55a to 55c according to the same image signal with second time ink ejected from the heads 55a, 55b, 55c at the same position as that where the first ink was ejected on the receiving medium, thus the first time ink and second time ink being printed on the same position on a receiving medium and printing for three lines being finished.

Then the administrating section 60 feeds the receiving medium 64 by 3 lines using a motor (not shown) for moving a receiving medium in the auxiliary scanning direction vertical to the direction S in which the head 55 scans, executes printing for the next three lines through the same operations as those described above, and repeats the operations until printing to all lines is finished.

In addition to the method described above in which the head is returned to the original position and printing is executed by scanning one line two times to eject ink at one position, as image signals for three lines are accumulated in the control section 54, the second time printing may be executed in a direction reverse to that in the first printing without returning the head to the original position. Also in addition to a set of the heads 55, another set of heads may be arrayed in the main scanning direction so that two lots of ink will be ejected one above another at one position by scanning one.

The way for deciding driving conditions for the head 55 for controlling a reflection density and the dither processing are the same as those in Embodiment 7 described above.

With the configuration as described above, in the ink jet printer comprising a plurality of heads for ejecting ink with the same density changing a dot diameter, it is possible not only to smoothly print an image with many gradation levels and obtain an image with high quality, but also to minimize a circuit scale because a number of gradation levels for one dot can be reduced, which makes it possible to provide a low cost and high speed ink jet printer. Also it is possible to execute dither processing suited to characters/illustrations or natural pictures, and as a plurality of heads are provided, it is possible to obtain an ink jet printer which can provide high quality images.

The above description assumes a case of a 4×4 dither matrix, but the matrix size is not limited to this one, and a matrix with vertical size different from the horizontal one may be used, and further a ordered dither for a pattern different from that in this Embodiment may be used. Also description of this Embodiment assumes a case where ink having the same density is printed one above another once changing the dot diameter, but there is not restriction over times of ejecting ink at one position, and as a number of gradation levels obtainable for one dot increases, it is possible to print an image with more gradation levels and also to minimize a matrix, which makes it possible to execute image printing without spoiling the resolution.

Figure 26:
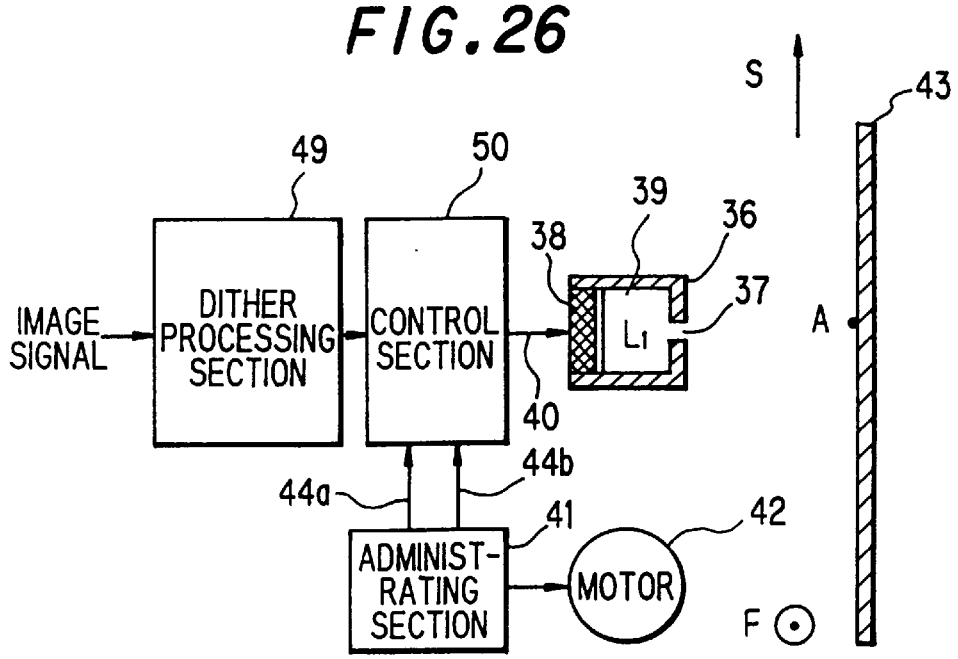
FIG. 26 is a view showing configuration of an ink jet printer in Embodiment 9 of the present invention.

Next description is made for Embodiment 9 of the present invention. FIG. 26 shows configuration in this Embodiment 9, and in this figure designated at the reference numeral 36 is an ink jet head as an ink outputting means comprising an ejection nozzle 37, a pressure generating element 38, and an ink chamber 39, at 49 a dither processing section as a gradation converting means for detecting pixels included in a low density area for an input image signal and executing ordered dither processing to the detected pixels, at 50 a control section for receiving an image signal outputted from the dither processing section 49 and generating a driving signal 40 for driving the ink jet head 36, at 42 a motor as a driving means for moving the ink jet head, at 41 an administrating section for controlling the control section 50 and the motor 42, at 43 a receiving medium, and at 44a and 44b start signals from the administrating section 41 for giving timing for ejection of ink to heads for printing ink ejected from the head 36 at one position on a receiving medium.

Next description is made for operations. Ink is filled in an ink chamber 39 of the ink jet head (called head hereinafter) 36. When an image signal is inputted, the dither processing section 49 compares a density value of the image signal to a threshold value stored therein, executes ordered dither processing to an image signal with a density value not more than the threshold value, and gives only data as to whether a dot should be formed to the pixel or not as an image signal. "1" is given when a dot is to be formed, and "0" when a dot is not to be formed. In a case where a density value of an image signal is larger than the threshold value, the input image signal is outputted as it is.

Then, when an image signal is inputted into the control section 50, the control section 50 generates the driving signal 40 for the head 36 for ejecting ink according to a signal level for each pixel constituting an image, and outputs the driving signal to the head 36. The pressure generating element 38 in the head 36 generates pressure according to the driving signal 40. In the head 36, ink having a density value of L1 is filled in the ink chamber 39, the ink is ejected from the ejection nozzle 37 due to pressure generated by the pressure generating element 38, and a dot is formed on the receiving medium 43. Then volume of ejected ink drops is changed by controlling a voltage of the driving signal 40, thus a diameter of a dot formed on the receiving medium being controlled.

It should be noted that, as the pressure generating element 38, there is available, for instance, an electricity-mechanical movement converting element or an electricity-heat converting element.

A table 46 with driving conditions for outputting driving signal 40 for the head 36 according to the image signal shown in FIG. 22 written therein is incorporated in the control section 50. The control section 50 generates the driving signal 40 according to the driving conditions in this table 46, and controls volume of ink drops first time and second time from the heads 55a, 55b, 55c through the same operations as those in Embodiment 7 described above.

The administrating section 41 makes the motor 42 operate like in Embodiment 7, moves the head 36 in the main scanning direction, and outputs a start signal 44a at the control section 50 so that the control section outputs a first driving signal when the head 36 has moved to a position A where a dot is to be formed first on the receiving medium. The control section 50 generates the driving signal 40 for actually driving the pressure generating element 38 according to the start signal 44a, outputs the driving signal 40 to the head 36 to have the ink ejected, and executes first time image printing for one line in the direction S.

When the first image printing is completed, the administrating section 41 rotates the motor in the reverse direction, returns the head 36 to the original position, and moves again the heads 36 in the main scanning direction. When the head 36 has moved to the position A where a dot is to be formed first on the receiving medium, the administrating position 41 outputs a driving signal 44b to the control section 50. Image signals for one line have been given to the control section 50, and a second time driving signal for the head 36 according to the same image signal is outputted in response to the start signal 44b, ink is ejected from the head 36 like in the first time operation, the ink ejected in the first time operation from the head 36 and that ejected in the second time operation therefrom are printed one above another at the same position, and then printing for one line is finished.

Then the administrating section 41 feeds the receiving medium 43 by one line using a motor (not shown) for moving a receiving medium in the direction F (called auxiliary scanning direction hereinafter) vertical to the direction S in which the head 36 scans, executes printing for the next one line through the same operations as these described above, and then repeats the operations until printing for all lines is finished.

The above description assumes a method of printing an image by returning a head to the original position for ejecting ink at one position one above another and scanning the same line twice, but as image signals for one line have been stored in the control section 50, the second scan may be executed in a direction reverse to the first one without returning the head to the original position. Also two heads with the same ink filled therein may be arrayed along the main scanning direction, so that two ejection lots of ink will be ejected on one position one above another in one scan.

Also the same operations as those in Embodiment 7 are executed to decide a driving condition for the head 36 to control a reflection density.

In the gradation method as described above, however, printing can not be executed to pixels included in a low density area. In FIG. 23, assuming that a density value in a case where a dot diameter is d0, namely minimum, is D0, as the dot diameter can not be made smaller, it can be understood that a dot can not be formed to a pixel included in an area with a density value lower than the density value D0. So in Embodiment 9, to the pixels included in an area with a density value lower than the density value D0, digital halftoning processing is executed to an input image signal. As the digital halftoning gradation processing, there is available the ordered dither processing, error diffusion processing, or density pattern processing.

Next description is made for a case, as an example, where the ordered dither processing is executed. A value corresponding to the density value D0 is regarded as a threshold value, and in the dither processing section 49, a density value of an input image signal is compared to the threshold value. For instance, in a case where the threshold value corresponding to the density value D0 is "18", the ordered dither processing is executed to all the image signals each having the density value of "18" or below, and image signals each having a density value more than "18", the image signals are outputted as they are. FIG. 17 shows a 3×3 dither threshold value matrix for dither processing. When this matrix is used, it is possible to express 9 gradation levels. Dither processing is executed using the dither threshold value shown in FIG. 17 to image signals each having a density value of not more than "18", and only data as to whether a dot is to be formed to the pixel or not is given as an image signal. "1" is outputted when a dot is to be formed, and "0" when a dot is not to be formed.

Then in a case where an image signal outputted from the dither processing section 49 is "1", a dot diameter is set to d0, the minimum value, in first printing, and a dot is formed on a receiving medium. A table with driving conditions for the head 36 each corresponding to an image signal shown in FIG. 22 written therein is incorporated in the control section 50, but this table is replaced with the table 51 shown in FIG. 27. In the table 51, the image signal is "1", and in this case only in first printing the driving condition "1" for obtaining the minimum dot diameter is set, and all of other portions corresponding to the image signals "0" to "18" are set to "0". Subsequent operations in the control section 50 are as described above, and a dot can be formed without fail to a pixel having been subjected to the dither processing.

With the configuration as described above, in an ink jet printer using ink with the same density and printing an image changing dot diameters, even to pixels included in an area with a low density which can not be reproduced only by ejecting the ink one above another at one position changing a dot diameter, the image can be represented with gradation levels, which make it possible to provide an image printer which can reproduce an image in a broader density range.

The above description of Embodiment 9 assumes a case of a 3×3 dither matrix, but the matrix size is not limited to this one, and a matrix with the vertical size different from that in the horizontal direction may be used. Also ordered dither or a dot pattern or error diffusion for a pattern different from that in this Embodiment may be used.

Figures 27, 28:
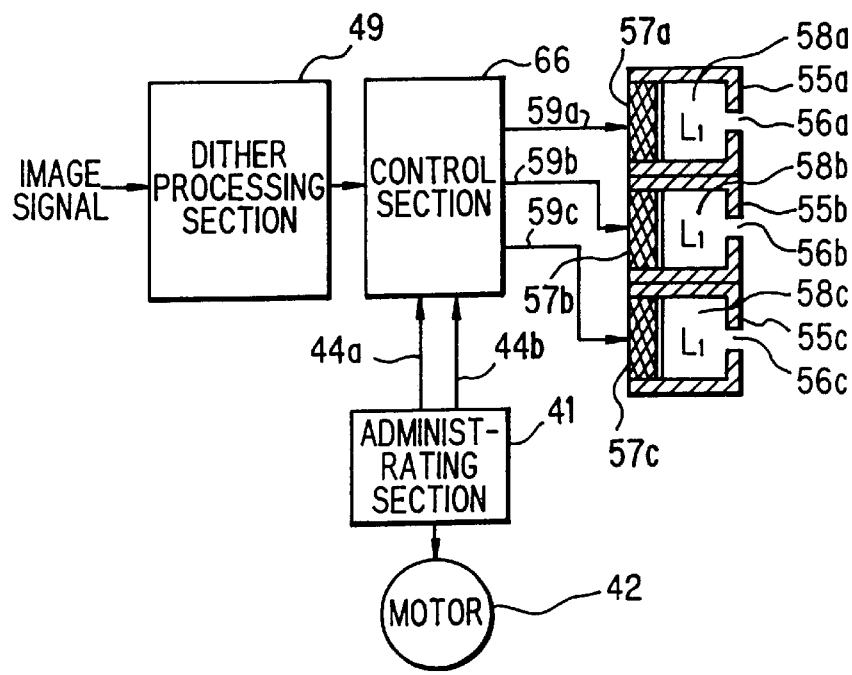
FIG. 27 is a view showing a table for a driving condition for driving a head in Embodiment 9 of the present invention.
FIG. 28 is a view showing another configuration of an ink jet printer in Embodiment 10 of the present invention.
Figure 31:
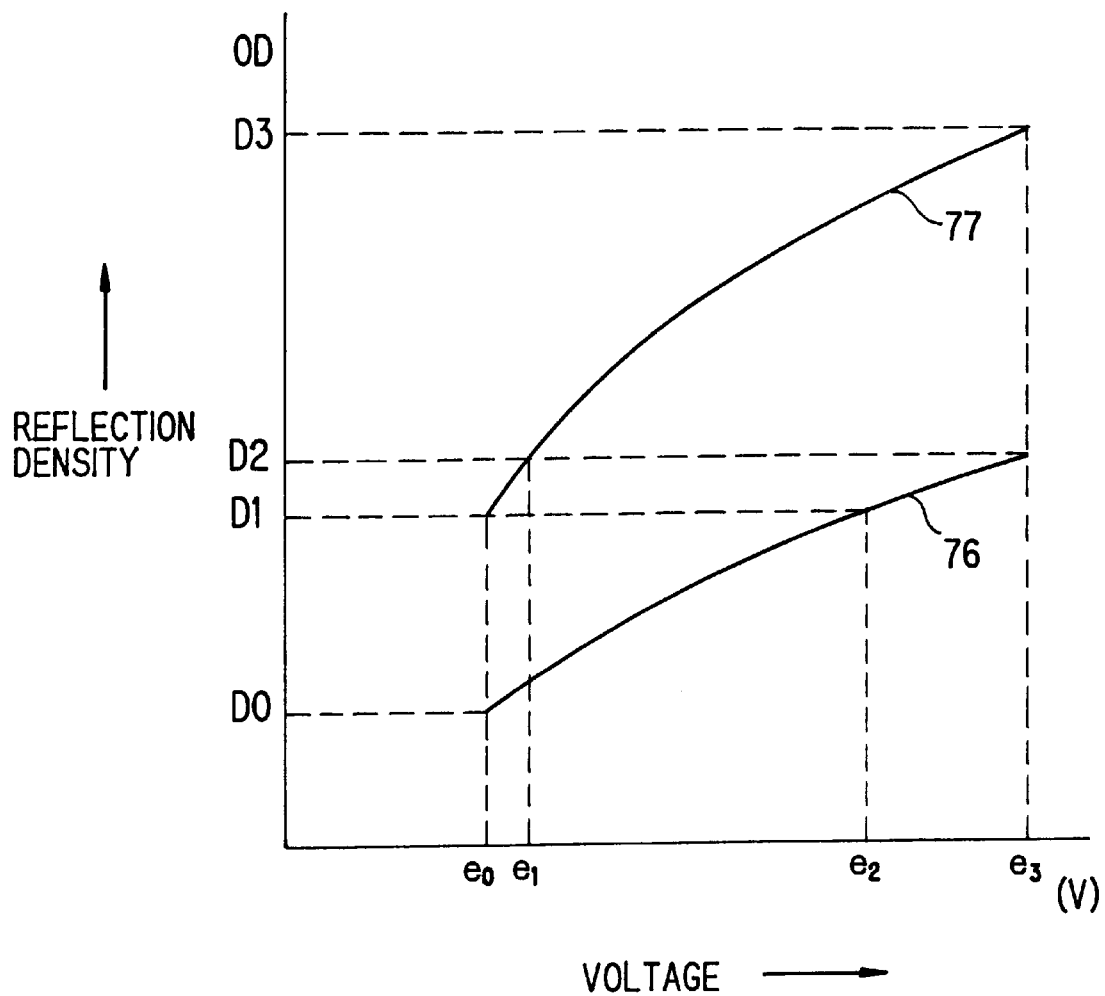
FIG. 31 is a view showing distribution of densities of two types of ink each having a different density.

Next description is made for Embodiment 10 of the present invention with reference to the related drawings. FIG. 28 shows configuration in Embodiment 10, and in this figure designated at the reference numerals 55a, 55b, 55c are ink jet heads as ink outputting means comprising ejection nozzles 56a, 56b, 56c, pressure generating elements 57a, 57b, 57c, and ink chambers 58a, 58b, 58c respectively, and like in Embodiment 8 shown in FIG. 28, the ejection nozzles 56a, 56b, 56c are arrayed in a direction vertical to the direction S (main scanning direction) in which the head 55 moves, and also ink having the same density value of L1 is filled in the ink chambers 58a, 58b, 58c of the ink jet heads (called head hereinafter) 55a, 55b, 55c.

The reference numeral 66 indicates a control section receiving image signals outputted from the dither processing section 49 and generating driving signals 59a, 59b, 59c for driving the heads 55a, 55b, 55c, and the control section stores image signals for 3 lines in the auxiliary direction, simultaneously outputs driving signals for three lines, namely the driving signal 59a to the head 55a printing a first line, the driving signal 59b to the head 55b printing a second line, and the driving signals 59c to the head 55c printing a third line, so that printing for three lines is executed all at once. Other portions on the configuration are the same as those in Embodiment 9 shown in FIG. 26.

Next description is made for operations in this embodiment.

When an image signal is inputted, the dither processing section 49 executes the same processing as that in Embodiment 9, and outputs the image signal to the control section 66.

When the image signal is inputted, the control section 66 generates the driving signals 59a to 59c each corresponding to signal level for each pixel constituting an image according to the table 46 incorporated therein and shown in FIG. 22, and outputs the driving signals to the heads 55a, 55b, 55c. The pressure generating elements 57a to 57c generate pressure corresponding to each of the driving signals 59a to 59c, ink is ejected from each of the ejection nozzles 56a to 56c according to the pressure generated by the pressure generating elements 57a to 57c, thus dots being formed on the receiving medium. In this step, volume of ink drops ejected first time and second time is changed by controlling a voltage of the driving signal 59 according to a driving condition in the table 46, thus a diameter of a dot formed in the receiving medium being controlled. As the pressure generating element 57, there is available, for instance, an electricity-mechanical movement converting element or an electricity-heat converting element.

Like in Embodiment 9, the administrating section 41 moves th head 55, and outputs the start signal 44a to the control section 66 so that the control section 66 outputs first time driving signals for the head 55a to 55c when the head has moved to the position A shown in FIG. 26. The control section 66 generates the driving signals 59a to 59c according to the start signal 44a, and outputs the driving signals to the heads 55a to 55c to make the heads eject ink, and executes first time image printing for three lines in the direction S.

When first time image printing is finished, the control section 54 executes the same operation as those in Embodiment 9, outputs second time driving signals for the heads 55a to 55c with the same image signal according to the start signal 44b outputted from the administrating section, so that the ink ejected second time from the heads 55a to 55c at the same position on a receiving medium as one at which the ink is ejected first time, and the ink ejected first time and the ink ejected second time are printed on above another at the same position on a receiving medium, thus printing for 3 lines being finished.

Then the administrating means 41 feeds the receiving medium 43 using a motor (not shown herein) for moving a receiving medium in the auxiliary scanning direction vertical to the direction S in which the head 55 scans, executes printing for the three lines through the same operations as those described above, and repeats the operations until printing for all lines is finished.

The above description assumes a method of returning a head to the original position and scanning one line twice to eject ink twice at the same position, but as image signals for 3 lines are stored in the control section 66, second time printing may be executed in a direction reverse to that in the first time without returning the head to the original position. Also another set of heads 55 may be arrayed along the main scanning direction so that two lots of ink can be ejected at the same position in one scan.

The way to decide a driving condition for the head 55 for controlling a reflection density is the same as that in Embodiment 7.

In the gradation method, however, printing can not be executed to pixels included in an area having a low density lower than a density value D0 in a case where the dot diameter is d0, the minimum value. For this reason, in this Embodiment 10, ordered dither processing is executed as a digital halftoning processing, so that printing can be made also to pixels included in an area with a density value lower than the density value D0. The ordered dither processing is executed through the same operations as those in Embodiment 9.

With the configuration described above, in an ink jet printer having a plurality of heads and ejecting ink with the same density changing a dot diameter, even to pixels included in an area with a low density which can not be reproduced only by ejecting ink one above another at one position and changing dot diameter, image printing can be executed with gradation levels, and also a broader density area can be reproduced, and furthermore as a plurality of heads are provided therein, a higher speed ink jet printer can be obtained.

As described above, with the present invention, an ink ejecting means is controlled so that a plurality type of ink each having a different density for the same color are ejected with desired dot diameters on a receiving medium according to an input image signal, and also a control means and a driving means are controlled so that a plurality type of ink each having a different density are ejected one above another on the same position on a receiving medium with a desired dot diameter, and for this reason a gradation method can be realized without spoiling the resolution in an ink jet printer, which makes it possible to obtain a high quality image with many gradation levels.

Secondly, a pulse width of a driving signal can be changed, so that change of a dot diameter is very easily controlled and the gradation expression as described above can easily be represented.

Thirdly, a piezoelectric element is used as a pressure generating means, and a rise time of a driving signal can be changed, so that change of a dot diameter can easily be controlled and the gradation representation as described above can easily be realized.

Fourthly, with the present invention, digital halftoning gradation processing is executed to an input image signal, so that, even in a case where a small number of types of ink are used, image printing can smoothly be executed with many gradation levels. Also a number of gradation levels for a dot can be reduced, so that a circuit scale can be minimized, and an ink jet printer which can provide high quality images with lost cost can be provided.

Fifthly, digital halftoning processing is executed to pixels included in a low density area, so that it is possible to obtain an image printer which can execute image printing with gradations even to pixels included in an area with a low density which can not be reproduced only by changing a dot diameter and ejection a plurality types of ink each having a different density one above another at one position on a receiving medium, and reproduce an image in a broader density area.

Sixthly, dither processing is executed switching a dither matrix for characters/illustration and for a natural picture, so that a higher quality image can be obtained.

Seventhly in an ink jet printer using ink having the same density and ejecting ink changing a dot diameter, distinction as to a character/illustration section and a natural picture section is automatically executed and dither processing suited to each section is executed, so that image printing can smoothly be executed with many gradations and not only a high quality image can be obtained but also a number of gradation levels for one dot can be reduced, and for this reason the circuit scale can be made smaller and a low cost ink jet printer can be obtained.

Eighthly, a plurality of ink heads each ejecting ink with the same density are provided, so that smooth image printing can be executed with many gradation levels, and not only a high quality image can be obtained, but also a number of gradation levels for one dot can be reduced, and for the reasons a circuit scale can be made smaller and an ink jet printer featuring not only a lost cost but also a high printing speed can be obtained.

Ninthly, in an ink jet printer using ink with the same density and ejecting ink at one position changing a dot diameter, pixels included in a low density area are detected and digital halftoning processing is executed to the detected pixels, so that it is possible to obtain an image printer which can execute image printing with gradation levels even to pixels included in a low density area, and reproduce an image with a broader density area.

Tenthly, a plurality of ink heads each ejecting ink with the same density are provided, so that it is possible to obtain a higher speed ink jet printer which can execute image printing even to pixels included in a low density area and reproduce an image with a broader density area.

This application is based on Japanese patent application No. HEI 7-325594 filed in the Japanese Patent Office on Dec. 14, 1995, the entire contents of which are hereby incorporated by reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An ink jet printer comprising:

an ink chamber in which ink is filled;

an ejection nozzle from which the ink said ink in chamber is ejected;

a pressure generating means for loading pressure to the ink in said ink chamber;

a plurality of ink ejecting means for ejecting the ink in said ink chamber from said ejection nozzle onto a receiving medium with pressure generated by said pressure generating means, and with a plurality of types of ink each having a different density of a same color stored therein;

a control means for controlling said ink ejecting means so that a plurality of types of ink each having a different density are ejected with a desired dot diameter onto said receiving medium according to an input image signal and are ejected in a range of reflection density by superpositioning a plurality of types of ink having different densities on the same position, wherein a diameter of a dot formed with a first ink type is fixed to a value based on a minimum diameter of said ink, such that the diameter of the dot formed with the first ink type is the same diameter over the range of reflection density, and a diameter of a dot for another of said plurality types of ink is adjusted over the range of reflection density;

a driving means for relatively moving said ink ejecting means to said receiving medium; and an administrating means for controlling said control means and said driving means so that said plurality of types of ink each having a different density will be ejected one above another onto a same specified position on said receiving medium with a desired dot diameter.

2. An ink jet printer according to claim 1; wherein said control means controls said plurality of ink ejecting means with pulse signals and controls a pulse width of the pulse signal.

3. An ink jet printer according to claim 1; wherein said pressure generating means is a piezoelectric element, and said control means controls a rise time of a control signal for controlling said ink ejecting means.

4. An ink jet printer according to claim 1; further comprising a gradation converting means having a function to process a digital halftoning.

5. An ink jet printer according to claim 4; wherein said gradation converting means detects pixels included in a low density area and subjects the pixels included in the detected low density area to the digital halftoning processing.

6. An ink jet printer according to claim 4; further comprising an image distinguishing means for differentiating characters and illustrations from natural pictures based on input image signals; wherein said gradation converting means has a plurality of dither matrixes each having a different matrix size or a pattern array respectively and executes a dither processing using a different dither matrix for characters/illustrations and natural pictures respectively.

7. An ink jet printer comprising:

an ink chamber in which ink is filled;

an ejection nozzle from which the ink in said ink chamber is ejected;

a pressure generating means for loading pressure to the ink in said ink chamber;

an ink ejecting means for ejecting the ink in said ink chamber from said ejection nozzle onto a receiving medium with pressure generated by said pressure generating means and with a plurality of types of ink, each having a different density of a same color stored therein;

a control means for controlling said ink ejecting means so that a plurality of types of ink each having a different density are ejected with a desired dot diameter onto said receiving medium according to an input image signal, and are ejected in a range of reflection density by superpositioning a plurality of types of ink having different densities on the same position, wherein a diameter of a dot formed with a first ink type is fixed to a value based on a minimum diameter of said ink, such that the diameter of the dot formed with the first ink type is the same diameter over the range of reflection density, and a diameter of a dot for another of said plurality types of ink is adjusted over the range of reflection density of a receiving medium to have continuous tone characteristics in the range of reflection density;

a driving means for relatively moving and said ink ejecting means to said receiving medium;

an administrating means for controlling and said control means and said driving means so that said plurality of types of ink each having a different density will be ejected one above another, each of said plurality of types of ejected ink having a desired dot diameter at a same specified position on said receiving medium;

an image distinguishing means for differentiating characters and illustrations from natural pictures according to said input image signal; and dither processing means having a plurality of dither matrices each having a different matrix size or pattern array and executing a dither processing using a different dither matrix for characters/illustrations and natural pictures respectively.

8. An ink jet printer according to claim 7; wherein said ink ejecting means comprises a plurality of ink ejecting means with a plurality type of ink each having a same density.

9. An ink jet printer comprising:

an ink chamber in which ink is filled;

an ejection nozzle from which the ink in said ink chamber is ejected;

a pressure generating means for loading pressure to the ink in said ink chamber;

an ink ejecting means for ejecting the ink in said ink chamber from said ejection nozzle onto a receiving medium with pressure generated by said pressure generating means;

control means for controlling said ink ejecting means so that said ink is ejected with a desired dot diameter onto said receiving medium according to an input image signal;

a driving means for relatively moving said ink ejecting means to said receiving medium;

an administrating means for controlling said control means and said driving means so that said ink will be ejected one above another with a desired dot diameter at a same specified position on said receiving medium; and a gradation converting means for detecting pixels included in a low density area according to said input image signal and subjecting the detected pixels in the low density area to digital halftoning processing, wherein said low density area is discriminated by a threshold value of density defined by the ink of lowest density with a minimum dot diameter, and said digital halftoning processing converts the pixels below the threshold value of density into processed data using threshold matrices to accomplish representing said low density area.

10. An ink jet printer according to claim 9 further comprising a plurality of ink chambers filled with ink, each ink having a same density.

11. An ink jet printer comprising;

an ink chamber in which ink is filled;

an ejection nozzle from which the ink in said ink chamber is ejected;

a pressure generator for loading pressure to the ink in said ink chamber;

a plurality of ink ejectors for ejecting the ink in said ink chamber from said ejection nozzle onto a receiving medium with pressure generated by said pressure generator, and with a plurality of types of ink each having a different density of a same color stored therein;

a controller for controlling said ink ejector so that a plurality of types of ink each having a different density are ejected with a desired dot diameter onto said receiving medium according to an input image signal and are ejected in a range of reflection density by superpositioning a plurality of types of ink having different densities on the same position, wherein a diameter of a dot formed with a first ink type is fixed to a value based on a minimum diameter of said ink, such that the diameter of the dot formed with the first ink type is the same diameter over the range of reflection density, and a diameter of a dot for another of said plurality types of ink is adjusted over the range of reflection density of a receiving medium to have continuous tone characteristics in the range of reflection density;

a driver for relatively moving said ink ejector to said receiving medium; and an administrator for controlling said controller and said driver so that said plurality of types of ink each having a different density will be ejected one above another onto a same specified position on said receiving medium with a desired dot diameter.

12. An ink jet printer according to claim 11, wherein said controller controls said plurality of ink ejectors with pulse signals and controls a pulse width of the pulse signal.

13. An ink jet printer according to claim 11, wherein said pressure generator is a piezoelectric element, and said controller controls a rise time of a control signal for controlling said plurality of ink ejectors.

14. An ink jet printer according to claim 11, further comprising a gradation convertor having a function to process a digital halftoning.

15. An ink jet printer according to claim 11, wherein said gradation convertor detects pixels included in a low density area and subjects the pixels included in the detected low density area to the digital halftoning processing.

16. An ink jet printer according to claim 14, further comprising an image distinguishing circuit for differentiating characters and illustrations from natural pictures based on input image signals; wherein said gradation convertor has a plurality of dither matrixes each having a different matrix size or a pattern array respectively and executes a dither processing using a different dither matrix for characters/illustrations and natural pictures respectively.

* * * * *